US006816330B2

(12) United States Patent
Ikeda et al.

(10) Patent No.: US 6,816,330 B2
(45) Date of Patent: Nov. 9, 2004

(54) METHOD FOR FORMING A MAGNETIC PATTERN IN A MAGNETIC RECORDING MEDIUM, MAGNETIC RECORDING MEDIUM MAGNETIC RECORDING DEVICE AND PHOTOMASK

(75) Inventors: Hiroyuki Ikeda, Yokohama (JP); Youji Arita, Yokohama (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 487 days.

(21) Appl. No.: 10/022,875

(22) Filed: Dec. 20, 2001

(65) Prior Publication Data

US 2002/0118477 A1 Aug. 29, 2002

(30) Foreign Application Priority Data

Dec. 22, 2000 (JP) .................................... 2000-390936

(51) Int. Cl.⁷ ................................................ G11B 5/02

(52) U.S. Cl. ........................ 360/59; 360/55; 360/57; 369/13.01; 369/13.02

(58) Field of Search ........................... 360/59, 55, 57, 360/131, 135; 369/13.01, 13.02

(56) References Cited

U.S. PATENT DOCUMENTS

| 3,869,711 | A | 3/1975 | Bernard et al. |
| 5,248,990 | A | 9/1993 | Ishikawa et al. |
| 5,325,244 | A | 6/1994 | Takano et al. |
| 5,991,104 | A | 11/1999 | Bonyhard |
| 6,359,747 | B1 | 3/2002 | Kuo |
| 6,377,414 | B1 * | 4/2002 | Wang ........................... 360/59 |
| 6,396,773 | B1 * | 5/2002 | Kuo ........................ 369/13.02 |

FOREIGN PATENT DOCUMENTS

| EP | 0 125 535 | 11/1984 |
| EP | 0 915 456 | 5/1999 |
| JP | 60-64376 | 4/1985 |
| JP | 62-43816 | 2/1987 |
| JP | 62-192025 | 8/1987 |
| JP | 63-166050 | 7/1988 |
| JP | 04-34744 | 2/1992 |
| WO | WO 99/30318 | 6/1999 |
| WO | WO 01/35396 | 5/2001 |

OTHER PUBLICATIONS

M. Nishikawa, et al., Digest of InterMag 2000, GT–06, pp. 1–3, "Readback Properties of Novel Magnetic Contact Duplication of High Recording Density Floppy Disk", Apr. 2000.

H. Horimai, et al., p. 223, "High–Density Storage by Means of Magnetic Holography on Amorphous Tb–Fe Thin Films", Nov. 1983.

Y. Arita, et al., Diskcon USA 2001, pp. 1–8, "A New Magnetic Printing Technology for Hard Disk Media", Sep. 18–20, 2001.

(List continued on next page.)

Primary Examiner—David Hudspeth
Assistant Examiner—Natalia Figueroa
(74) Attorney, Agent, or Firm—Oblon, Spivak, McClelland, Maier & Neustadt, P.C.

(57) ABSTRACT

A method for forming a magnetic pattern in a magnetic recording medium, which includes irradiating energy beams to a magnetic recording medium having a magnetic layer on a substrate via a photomask having a transmitting portion and a nontransmitting portion to heat locally an irradiated portion of the magnetic layer. The method also includes applying an external magnetic field to the magnetic layer. The transmitting portion and the non-transmitting portion of the photomask each has a reflectivity of energy beam of 30% or less in at least one surface facing the magnetic recording medium. By using techniques of heating a local portion and applying an external magnetic field in combination, a fine magnetic pattern can be effectively and accurately formed while the production of an interference fringe is suppressed.

33 Claims, 3 Drawing Sheets

OTHER PUBLICATIONS

L. Wang, et al., 46th Annual Conference on Magnetism & Magnetic Materials, 1 page, "HD–01. Photo Thermal Patterning on Magnetic Media", Nov. 12–16, 2001.

U.S. patent application Ser. No. 10/058,872, filing date unknown, patentee unknown.

U.S. patent application Ser. No. 10/022,875, filed Dec. 20, 2001, pending.

U.S. patent application Ser. No. 10/212,688, filed Aug. 7, 2002, pending.

* cited by examiner

METHOD FOR FORMING A MAGNETIC PATTERN IN A MAGNETIC RECORDING MEDIUM, MAGNETIC RECORDING MEDIUM MAGNETIC RECORDING DEVICE AND PHOTOMASK

The entire disclosure of Japanese Patent Application No. 2000-390936 filed on Dec. 22, 2000 including specification, claims, drawings and summary are incorporated herein by reference in its entirety.

BACKGROUND OF THE INVENTION

1. Field of the Invention

The present invention relates to a method for forming a magnetic pattern in a magnetic recording medium such as a magnetic disk used for a magnetic recording device, or a photomask used for such method. Also, the present invention relates to a magnetic recording medium produced by using the photomask or a magnetic recording device.

2. Discussion of Background

Magnetic recording devices represented by a magnetic disk device (a hard disk drive) have widely been used as external memory devices for information processing devices such as computers, and have recently been used as recording devices such as devices for recording dynamic images or for set-top boxes.

A typical magnetic disk device comprises a shaft for holding a single or plurality of magnetic disks by penetrating the center of the magnetic disk or disks, a motor for rotating the magnetic disk or disks which is or are connected to the shaft by interposing a bearing or bearings, a magnetic head for recording/reproducing information, an arm for supporting the magnetic head and an actuator for moving the magnetic head via the arm to a desired position on the magnetic recording medium.

As the magnetic head for recording/reproducing signals, a flying head capable of moving above the magnetic disk at a constant flying height is generally used. Other than the flying head, a contact head is proposed in order to make the distance to the medium closer.

A magnetic recording medium (a magnetic disk) to be placed on the magnetic disk device is prepared generally by forming a NiP layer on the surface of a substrate comprising an aluminum alloy, applying a predetermined smoothing treatment, a texturing treatment or the like thereon, and then, forming successively a metallic underlayer, a magnetic layer (an information recording layer), a protective layer, a lubricant layer and the like in this order thereon. Or, it may be prepared by forming successively a metallic underlayer, a magnetic layer (an information recording layer), a protective layer, a lubricant layer and the like on the surface of a substrate made of glass or the like.

The magnetic recording medium includes a longitudinal magnetic recording medium and a perpendicular magnetic recording medium. In the longitudinal magnetic recording medium, longitudinally recording is generally conducted.

The speed of increasing the magnetic density of magnetic recording media is more year by year, and various techniques for increasing the density have been proposed. For example, there are attempts to make the flying height of the magnetic head smaller, to employ a GMR head as the magnetic head, to improve a magnetic material used for the recording layer of the magnetic disk so as to have a strong coercive force, and to reduce the space between tracks for recording information of the magnetic disk. For example, a density of track of 100 Ktpi or more is needed in order to realize 100 Gbit/inch$^2$.

In each track, a magnetic pattern for controlling the magnetic head is formed. For example, it produces signals used for controlling the position of the magnetic head or signals used for synchronous control. When the space between adjacent information recording tracks is narrowed to increase the number of tracks to thereby obtain a high recording density, it is necessary to make signals for controlling the position of a data-recording/reproducing head (hereinbelow, referred to as "a servo signal") dense in a radial direction of the disk in response to the increased number of tracks, i.e., to generate the signals much more so that a precise control can be performed.

On the other hand, it is necessary for the high recording density to increase the data recording capacity by reducing the surface area other than the area used for recording data, namely, an area used for the servo signals and gap portions between the servo areas and the data recording areas whereby the data recording area can be broadened. For this purpose, it is necessary to increase the output of the servo signals or to increase the accuracy of synchronizing signals.

As a conventional method used widely for manufacturing magnetic recording media, an opening was formed in the vicinity of the head actuator of the drive (magnetic recording device), a pin with an encoder was inserted into the opening to engage the actuator with the pin whereby servo signals were recorded by moving the head to a correct position. However, such method encountered difficulty in recording correctly the servo signals because the position of the gravity center of the actuator was different from the position of the gravity center of a positioning mechanism, so that highly accurate track position control could not be obtained.

On the other hand, there is a proposed technique that laser beams are irradiated to a magnetic disk to deform locally the surface of the disk whereby minute projections and recesses are physically formed so that servo signals are produced by the minute projections and recesses. In this technique, however, there were such problems that the formed projections and recesses made the flying magnetic head unstable to affect adversely recording or reproducing of information; laser beams having a large power was needed for forming the projections and recesses, thus being costly, and it took much time to form the projections and recesses one by one.

In view of the above, some servo signal forming methods have recently been proposed.

As an example, there is a method that a servo pattern is formed in a master disk having a magnetic layer of high coercive force, and the master disk is brought to close contact with a magnetic recording medium and then, an auxiliary magnetic field is applied to the medium from the outside whereby a magnetic pattern is printed (U.S. Pat. No. 5,991,104).

As another example, there is a method that a medium is previously magnetized along a certain direction, a soft magnetic layer of high permeability and low coercive force is formed by patterning on a master disk, and the master disk is brought to close contact with the medium and then, an external magnetic field is applied to the opposite direction of the previous magnetized direction. In this method, the soft magnetic layer functions as a shield, and a magnetic pattern is printed in an unshielded area (see, JP-A-50-60212 (U.S. Pat. No. 3,869,711), JP-A-10-40544 (EP915456), and Digest of InterMag 2000, GP-06). In the above-mentioned techniques, a master disk is used and a magnetic pattern is formed in the medium by applying a strong magnetic field.

The intensity of a magnetic field generally depends on distances. Accordingly, when a magnetic pattern is recorded by applying a magnetic field, the boundary of a formed magnetic pattern is apt to be unclear due to a leaking magnetic field. Accordingly, it is essential to bring the master disk into close contact with the medium in order to minimize the influence of the leaking magnetic field. As the magnetic pattern is finer, it is necessary to bring them to close contact without any gap. Usually, the both members are press-contacted by using vacuum suction. Further, the higher the coercive force of the medium is, the larger the magnetic field used for the printing is, and accordingly, the leaking magnetic field becomes large. Therefore, perfect close contact is desirable.

The above-mentioned techniques are easily applicable to a magnetic disk having a low coercive force or a flexible floppy disk being easy for press contact. However, it is very difficult for these techniques to apply a magnetic disk for high density recording comprising a hard substrate which has a coercive force of 3,000 Oe or more. Namely, in the magnetic disk comprising a hard substrate, there was possibility that fine dust deposits thereon at the time of bringing the disk into close contact with the master disk, whereby a defect was resulted in the medium, or the expensive master disk is damaged. In a case of using a glass substrate, in particular, there was a problem that the deposition of dust may cause insufficient close contact, so that it might be impossible to conduct magnetic printing, or a crack was resulted in the magnetic recording medium.

Further, in the technique described in JP-A-50-60212, there was such problem that a pattern having an angle oblique to a direction of tracks in a disk, although recording is possible, was limited to a pattern which was weak in signal intensity. Namely, in a magnetic recording medium having a high coercive force of 2,000–2,500 Oe or more, it is indispensable, for a ferromagnetic material (for a shielding material) for forming a pattern in the master disk, to use permalloy or a soft magnetic material having a large saturation magnetic flux density such as sendust in order to assure a sufficient magnetic field intensity for printing.

However, in the case of the oblique pattern, a magnetic field of reversed magnetization was oriented in a direction perpendicular to the gap produced by the ferromagnetic layer of the master disk, and it was impossible to incline the magnetization in a desired direction. As a result, a part of the magnetic field escapes into the ferromagnetic layer and a sufficient magnetic field could not be applied to a desired position in magnetic printing whereby a sufficient pattern of reversed magnetization could not be obtained, and it was difficult to produce signals of high intensity. In using the oblique magnetic pattern, the reduction of the output of reproducing signals was larger than the azimuth loss, in comparison with a case of using a magnetic pattern perpendicular to the tracks.

Japanese Patent Application Nos. 2000-134608 and 2000-134611 describe a technique of forming a magnetic pattern in a magnetic recording medium by combining the heating of a local portion and the application of an external magnetic field. Specifically, the method is such that the medium is previously magnetized in a direction, energy beams or the like are irradiated through a patterned photomask to heat a local portion of the medium to lower the coercive force of the heated area, and at the same time, an external magnetic field is applied thereto whereby recording is effected to the heated area, so that a magnetic pattern is formed.

In this technique, it is unnecessary that the intensity of the external magnetic field is higher than the coercive force of the medium since the external magnetic field is applied after the coercive force is lowered by heating, and accordingly, it is possible to form the magnetic pattern with a weaker magnetic field. Further, since the area subjected to recording is limited to the heated area, i.e., the recording can not be effected even when the magnetic field is applied to an area other than the heated area, a clear magnetic pattern can be recorded without bringing the mask to close contact with the medium. Therefore, there is no danger of damaging the medium or the mask by pressing the mask, or there is no possible defect in the medium.

Further, according to this technique, since it is unnecessary to shield the external magnetic field with use of a soft magnetic material for a master disk as required in the conventional technique, an oblique magnetic pattern can be formed well.

The photomask used for the above-mentioned magnetic pattern forming methods can be any as far as it is provided with a transmitting portion and a non-transmitting portion by which a predetermined magnetic pattern is formed. For example, a transparent substrate such as quartz glass, soda lime glass or the like may be used. A metallic layer of Cr or the like is formed on the substrate by sputtering; a photoresist is coated on the metallic layer, and etching or the like is conducted to thereby form the transmitting portion and the non-transmitting portion in predetermined portions. In this case, the portion having the Cr layer on the substrate constitutes the non-transmitting portion and the portion without having any layer on the substrate constitutes the transmitting portion.

As described above, the magnetic pattern forming methods described in Japanese Patent Application Nos. 2000-134608 and 2000-134611 are excellent in forming effectively and accurately a various fine magnetic patterns without damaging the magnetic recording medium or the mask and without increasing defects in the mask. This technique had, however, a problem that an interference fringe might result in the pattern forming surface when the photomask was used, by the reason described below, whereby the accuracy of the magnetic pattern was decreased.

Namely, when light which has transmitted through the photomask reaches the magnetic recording medium, the almost amount of the light is absorbed in the surface of the medium. However, a part of the light is reflected. The reflected light reaches again the mask, and a part of the reflected light is reflected on the surface of the mask whereby an interference fringe is formed. When the interference fringe is formed, a tint pattern of energy beam which is different from the mask pattern is produced in the energy beams whereby the modulation of output signals from the magnetic pattern is deteriorated.

SUMMARY OF THE INVENTION

It is an object of the present invention to provide a method for forming a magnetic pattern in a magnetic recording medium, which is capable of forming effectively and accurately a fine magnetic pattern by combining the heating of a local portion and the application of an external magnetic field, and a photomask used for such method.

It is an object of the present invention to provide a magnetic recording medium and a magnetic recording device capable of effecting further high density recording, which can be provided in a short time and economically by utilizing the above-mentioned method and/or the photomask.

According to the present invention, there is provided a method for forming a magnetic pattern in a magnetic recording medium, comprising a step of irradiating energy beams to a magnetic recording medium having a magnetic layer on a substrate via a photomask having a transmitting portion of energy beam and a non-transmitting portion of energy beam to heat locally an irradiated portion of the magnetic layer, and a step of applying an external magnetic field to the magnetic layer, the method being characterized in that the transmitting portion and the non-transmitting portion of the photomask have each a reflectivity of energy beam of 30% or less in at least its one surface facing the magnetic recording medium.

According to the present invention, there is provided a photomask used for a method for forming a magnetic pattern in a magnetic recording medium, including a step of irradiating energy beams to a magnetic recording medium having a magnetic layer on a substrate via a photomask having a transmitting portion of energy beam and a non-transmitting portion of energy beam to heat locally an irradiated portion of the magnetic layer, and a step of applying an external magnetic field to the magnetic layer, the photomask being characterized in that the transmitting portion and the non-transmitting portion of the photomask have each a reflectivity of energy beam of 30% or less in at least its one surface facing the magnetic recording medium.

According to the magnetic pattern forming method, it is unnecessary to use a strong external magnetic field as in the conventional technique because the locally heating and the application of an external magnetic field are used in combination in forming a magnetic pattern. Further, even when the magnetic field is applied to an area other than the heated area, the area applied with the magnetic field is not magnetized, and accordingly, the area for forming magnetic domains can be limited to the heated area. Accordingly, the boundary of the magnetic domains is clear whereby a pattern having a small magnetic transition width, a very steep magnetic transition at the boundary of the magnetic domains and a high quality of output signals, can be formed. Further, the magnetic transition width can be formed to be 1 $\mu$m or less by selecting suitably conditions.

Further, it is unnecessary to press-contact the magnetic recording medium to the master disk as in the conventional technique. Accordingly, a magnetic pattern oriented oblique to the tracks can be formed well without a danger of damaging the medium or the mask, or without increasing defects in the medium.

Further, since the energy beams are used for heating a local portion of the magnetic recording medium, it is easy to control the size of the portion to be heated and power used whereby a magnetic pattern can be formed accurately.

Further, when the photomask is once prepared, a magnetic pattern having a desired shape can be formed in the medium. Accordingly, a complicated pattern or a unique pattern which was difficult to form in the conventional technique can easily be formed.

For example, in a phase servo system for a magnetic disk, a magnetic pattern which extends from an inner periphery to an outer periphery linearly in a oblique direction to the radius and the tracks, is used. In the conventional servo pattern forming method wherein servo signals were recorded for each track while the disk was rotated, it was difficult to form a pattern continuous to the radial direction or a pattern extending oblique to the radial direction. In the present invention, however, complicated calculation or a complicated device structure is unnecessary, and such magnetic pattern can be formed easily in a short time by irradiating energy beams at a time.

It is not always necessary for the photomask to cover the whole surface of the magnetic disk but it may have a size sufficient to include a repetition unit for forming the magnetic pattern. Since such photomask can be used by moving successively, the magnetic pattern can be formed a simple and economical way.

Further, when the beam diameter of energy beams is formed to be a large diameter or a longitudinally elongated elliptical shape, a plurality of tracks or a plurality of sectors of a magnetic pattern can be irradiated in a lump. Accordingly, writing efficiency can further be increased, and a problem of taking much time in writing servo signals with a future increase of the capacity can preferably be improved.

The photomask can be such one capable of forming a tint (an intensity distribution) of energy beams in the surface of the magnetic disk so as to correspond to a magnetic pattern to be formed. However, it is preferable to use a photomask having a transmitting portion for transmitting energy beams according to a pattern in view of easiness and cost.

In the present invention, the photomask having a reflectivity of energy beam of 30% or less at both the transmitting portion and the non-transmitting portion in at least its one surface of the photomask which faces the magnetic recording medium, is used.

In the conventional technique in a field of semiconductor, anti-reflection coating is applied to a light exposure surface (a surface to which light is exposed) of the photomask, i.e., the surface, on the opposite side of a semiconductor substrate, of the photomask, in order to decrease the reflectivity of the surface. If the reflectivity of the light exposure surface is high, exposure light is reflected to thereby decrease efficiency in using optical energy. The provision of the anti-reflection layer is to prevent the reflection and allows to use the optical energy efficiently.

On the other hand, the present invention is featurized by decreasing the reflectivity of the surface, facing the magnetic recording medium, of the photomask.

In the field of semiconductor, since the exposure of light was conducted to a photoresist of high reflectivity disposed on a semiconductor substrate through a mask, there was no problem of the interference of light between the mask and the substrate. On the other hand, since the magnetic recording medium subjected to the exposure has a metallic layer and a carbon layer on its surface, and the reflectivity is generally very high in comparison with the photoresist, there was such problem that light is reflected to interfere mutually between the mask and the medium, whereby an interference fringe is produced.

According to the present invention, the production of an interference fringe can be suppressed by using a photomask which suppresses substantially the reflection of energy beams on its surface facing the medium, whereby it is possible to form an accurate magnetic pattern having a small modulation. The reflectivity usable in the present invention is 30% at a maximum. More preferably, the reflectivity of the surface, facing the magnetic recording medium, of the photomask is 20% or less. Further, the reflectivity of the photomask to energy beams is preferably low as possible. However, it is generally 0.01% or more.

By the reason as described above, the present invention provides a remarkable effect in the formation of a magnetic pattern in a magnetic recording medium having a reflectivity of energy beam of 30% or more. However, if the reflectivity of energy beam is excessively high, the absorption of the energy beams is not sufficient. Accordingly, the reflectivity of energy beam of the magnetic recording medium is preferably 90% or less.

The photomask may be a mask having a transmitting portion and a non-transmitting portion formed so as to correspond to a predetermined magnetic pattern. Generally, predetermined transmitting portion and non-transmitting portion can be formed by forming a metallic layer of Cr or the like by sputtering on a transparent substrate such as quartz glass, optical glass, soda lime glass or the like; coating a photoresist thereon and etching the photoresist to remove locally the metallic layer. In this case, the portion having the Cr layer on the substrate constitutes the non-transmitting portion of energy beam, and the portion without having any layer on the substrate constitutes the transmitting portion.

However, Cr used generally for forming the non-transmitting portion has a very high reflectivity. Accordingly, in the present invention, it is desirable to cover an outermost layer of the surface, facing the magnetic recording medium, of non-transmitting portion with a layer having a low reflectivity. For this, it is preferable that the outermost layer of the surface, facing the magnetic recording medium, of the non-transmitting portion is a chromium oxide layer.

Further, it is preferable that the outermost layer of the photomask of the present invention is covered with a dielectric layer. Namely, the dielectric layer formed as the outermost layer of the surface, facing the magnetic recording medium, of the non-transmitting portion decreases further the reflectivity. It is also preferable that when the outermost layer of the surface, facing the magnetic recording medium, of the transmitting portion is a dielectric layer, the reflection of light at the substrate surface of the photomask can be presented.

It is also preferable that the reflectivity of the surface, on the opposite side of the magnetic recording medium (light exposure surface), of the photomask is 30% or less. With this, the reflection of energy beams at the light exposure surface can be prevented, and energy can be used effectively. Accordingly, the irradiation power of energy beams can be reduced, and the possibility of damaging the photomask or the magnetic recording medium can be reduced, and the durability can be improved. In particular, the durability of the photomask in repetitive use can be increased.

In the magnetic pattern forming method of the present invention, energy beams of high power are irradiated, so that the photomask may be damaged in repetitive use. It is therefore significant to improve the possible damage to the photomask.

When the outermost layer of the surface, on the opposite side of the magnetic recording medium, of the photomask is constituted by a dielectric layer, the reflection can preferably be decreased and energy can effectively be used.

In forming the dielectric layer for anti-reflection, a coating layer which can reduce substantially the reflection of light to a specified wavelength is called, in particular, a V coat layer. When laser is used as energy beams, it is preferable to form the V coat layer by taking advantage of mono-wavelength properties. When energy beams of an ultraviolet region (wavelength: 200–300 nm) are used for a quartz glass substrate, the reflectivity is about 5% of incident light. However, by forming the dielectric layer, the reflectivity can be reduced to 1% or less and a remarkable improvement of the modulation can preferably be obtained.

Although such dielectric layer can be formed by a sputtering method or a vapor deposition method, it is preferable to use the sputtering method in order to obtain a dielectric layer having a high durability to energy beams. In the layer forming technique, there is a danger that the dielectric layer is peeled off during the repetitive use of the photomask by the irradiation of pulsed energy beams such as pulsed laser of high power in order to form correctly a magnetic pattern because the pulsed laser has a high peak value of energy density. The power per pulse of the pulsed energy beams is preferably from 10 mJ/cm$^2$ to 1,000 mJ/cm$^2$.

In particular, it is preferable to use the sputtering method when the dielectric layer is formed on the surface having recesses and projections.

An anti-reflection layer made of a dielectric layer used in the conventional semiconductor field was generally formed on a flat surface without recesses and projections, such as a light exposure surface of the photomask. The surface, facing the magnetic recording medium, of the photomask has generally a structure having recesses and projections, which is resulted from forming a non-transmitting layer on a light transmitting substrate. In such surface having recesses and projections, a stress generates easily in a corner portion whereby the dielectric layer easily peels off from such surfaces in comparison with the flat surface.

Further, it is preferable that the substrate of the photomask is made of a material containing quartz as the main component. Namely, the quartz has a high permeability of energy beam in a ultraviolet region, and it is advantageous in using energy beams of a short wavelength of 300 nm or less which allows fine processing easily.

In the formation of the magnetic pattern of the present invention, it is preferable that the photomask is disposed with a space of 1 mm or less between the photomask and the magnetic recording medium. If the distance is larger than 1 mm, the diffraction of the energy beams is large, and the shape of the formed magnetic pattern is unclear.

According to the magnetic recording medium of the present invention in which a magnetic pattern is formed by using the photomask of the present invention and according to the method of the present invention, good results of less influence of the interference fringe; highly accurate magnetic pattern, and a modulation of the output signal of the magnetic pattern being 25% or less are obtainable. In particular, when a servo pattern is formed, a large effect is obtainable because the size of the modulation influences largely the precision of position determination. The modulation (Mod) at this moment is expressed by Mod=(AMPmax−AMPmin)/TAA×100 where TAA (Total Average Amplitude) is an averaged output in the same pattern area, and AMPmax and AMPmin are respectively the maximum value and the minimum value in that area. The modulation value is an index of the uniformity of signals, and the smaller the value is, the better. In this case, TAA, AMPmax and AMPmin are all values in peak-to-peak. The value of the modulation is preferably 25% or less, more preferably, 10% or less in consideration of servo tracking accuracy.

The magnetic recording device of the present invention is characterized by comprising a magnetic recording medium, driving means for driving the magnetic recording medium in a recording direction, a magnetic head having a recording portion and a reproducing portion, means for moving relatively the magnetic head with respect to the magnetic recording medium, and recording/reproducing signal processing means which supplies a recording signal to the magnetic head and receives a reproducing signal from the magnetic head. As the magnetic recording medium, a magnetic recording medium in which a magnetic pattern such as a highly accurate servo pattern or the like is formed according to the present invention, is used, whereby high density recording is possible and error-free recording can be conducted because there is few flaw and defect in the medium.

By using such magnetic recording device in which the magnetic recording medium is assembled, it is possible to obtain signals by reproducing the magnetic pattern by the magnetic head and to record servo burst signals based on the signals by the magnetic head.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Explanation will be made in more detail with reference to drawings.

Figure 1A:
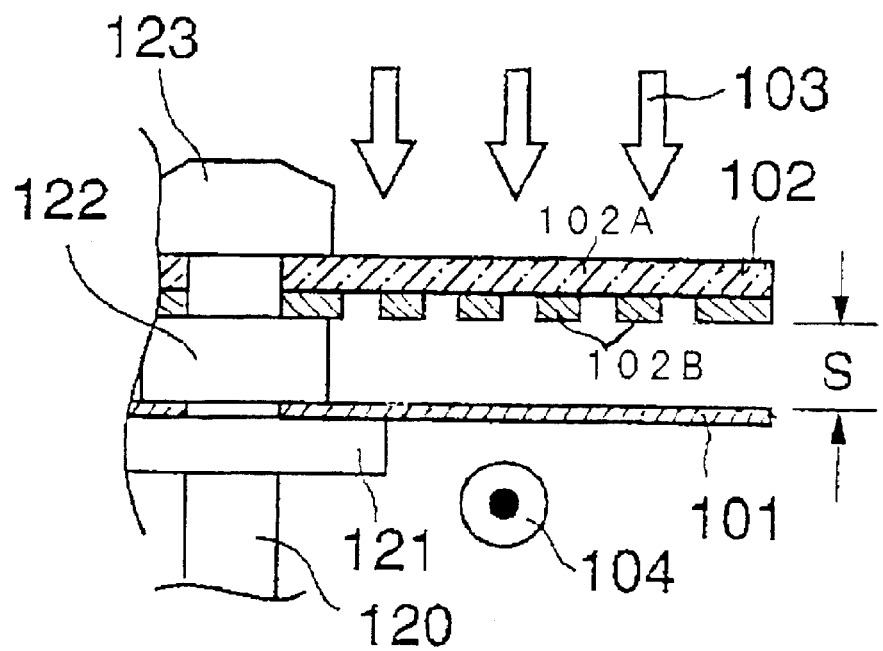
FIG. 1(a) is a diagrammatic cross-sectional view showing an example of the method for forming a magnetic pattern using the photomask of the present invention.
Figure 1B:
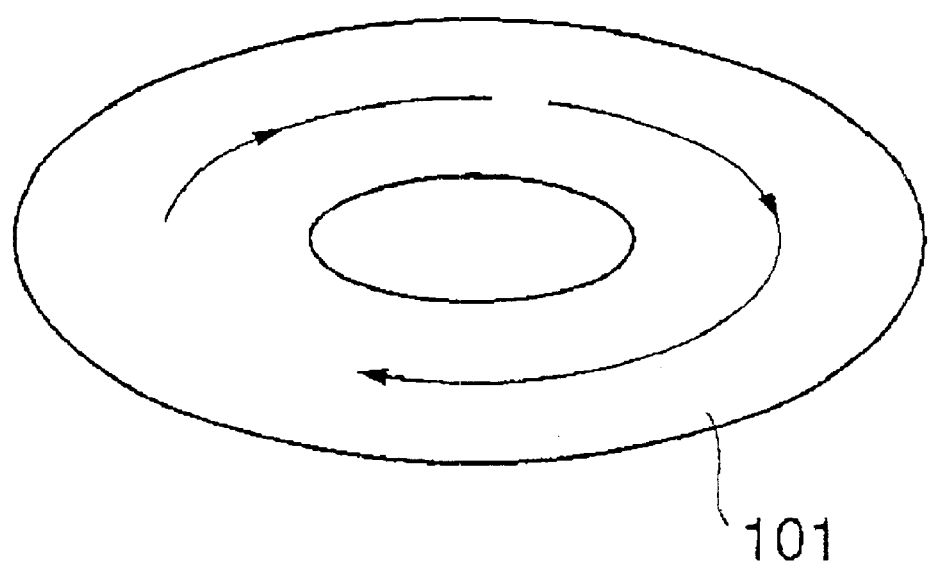
FIG. 1(b) is a diagrammatic slant view showing a magnetization direction of the magnetic disk.

A method for forming a magnetic pattern using a photomask according to the present invention will be described with reference to FIGS. 1 and 2. FIG. 1(a) is a diagrammatic cross-sectional view showing an example of the magnetic pattern forming method using the photomask of the present invention, and FIG. 1(b) is a slant view showing a magnetization direction of the magnetic disk of the present invention. FIG. 2 is a cross-sectional view showing an embodiment of the photomask of the present invention.

A magnetic recording medium (a magnetic disk) 101 is previously magnetized uniformly in a direction along a circumferential direction by applying an external magnetic field (FIG. 1(b)). Then, the magnetic recording medium 101 is attached to a spindle 120 (FIG. 1(a)). Specifically, the medium is placed on a turntable 121, and a photomask 102 is put on the medium by interposing a spacer 122. Further, a pressing plate 123 is put on the photomask 102, and the photomask is fixed by screws (not shown). Then, a space S is provided between the magnetic recording medium 101 and the photomask 102 by means of the spacer 122. In this state, pulsed laser beams 103 are irradiated, and at the same time, an external magnetic field 104 is applied. The direction of the applied external magnetic field is opposite to the direction of the external magnetic field applied previously for uniform magnetization to the magnetic recording medium 101.

In forming a magnetic pattern, the photomask 102 in which a plurality of transmitting portion (which are provided by a transparent substrate 102A) and a plurality of non-transmitting portions 102B, by which a magnetic pattern is formed, is used. Through such photomask, the laser beams 103 are irradiated to a magnetic layer of the magnetic recording medium 101. In this case, it is preferable that the diameter of beams is made large, or the shape of the beams is a longitudinally elongated elliptical shape, and the laser beams are irradiated to a plurality of tracks or a plurality of sectors for the magnetic pattern in a lump. Then, efficiency of recording can further be increased. Further, a problem of the increase of servo signal recording time with an increase of the capacity in future can be improved, and therefore, it is very desirable.

In the method for forming a magnetic pattern of the present invention, a photomask having a plurality of transmitting portions (hereinbelow, referred to simply as a transmitting portion) and a plurality of non-transmitting portions (hereinbelow, referred to simply as a non-transmitting portion) each having a reflectivity of energy beam of 30% or less is used as the photomask 102. Thus, by reducing the reflectivity of the photomask, the production of an interference fringe can be controlled, and a highly accurate magnetic pattern can be formed while the modulation is lessened. Although the reflectivity should be low as possible, it is usually 0.01% or more.

As described above, the photomask 102 is provided with a transmitting portion and a non-transmitting portion by forming partly the non-transmitting layer 102B on the transparent substrate 102A.

Although the transparent substrate 102A for the photomask 102 may be any as far as it can transmit sufficiently energy beams, it is preferable to use a material containing quartz as the main component. The quartz glass is relatively expensive. However, it has high light transmitting properties to energy beams of ultraviolet region. Accordingly, there is an advantage that energy beams of short wavelength such as 300 nm or less which allow easily fine processing can be used. In a case that energy beams having a longer wavelength than the above-mentioned is used, optical glass is better in cost. The thickness of the transparent substrate 102A is not in particular limited. However, a thickness of from about 1 to 10 mm is generally preferable in order to obtain flatness in a stable manner without causing a curve in the substrate.

Figure 2A:
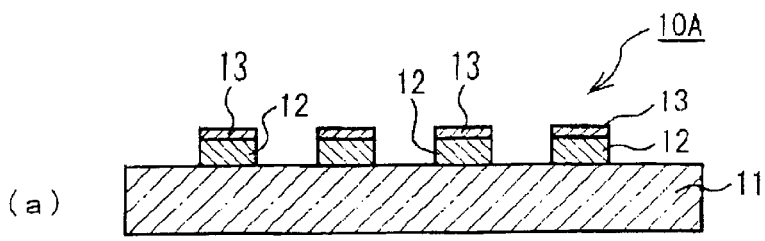
FIG. 2 is a cross-sectional view showing an embodiment of the photomask of the present invention.

Further, it is preferable that the non-transmitting layer of the photomask is a multi-layer of a chromium layer and a chromium oxide layer. It is preferred to prepare a photomask 10A with a non-transmitting layer which can be provided by forming successively a chromium layer 12 and a chromium oxide layer 13 on a quartz glass substrate 11 as shown in FIG. 2(a). Namely, since the reflectivity of the quartz glass constituting the transmitting portion is about 5% and on the other hand, the reflectivity of chromium is very high, it is preferable to cover the surface of the chromium layer with another layer having a low reflectivity. For instance, a front surface of the non-transmitting portion is covered with chromium oxide having a reflectivity of about 16%. Energy beams reflected at the medium surface can be prevented from returning to the medium after the energy beams have been reflected again at the mask. Use of the chromium oxide layer is preferable because it has a low reflectivity, and it can be formed only by oxidizing chromium. Further, it has an excellent contacting properties to the chromium layer.

As an example of the method for producing the photomask 10, there is a method that a chromium layer is first formed on a substrate for the mask such as quartz, and a chromium oxide layer is formed thereon. As the method for forming the chromium layer, there are a sputtering method, a vapor deposition method, a coating method and so on. Among these, the sputtering method is preferable from the viewpoint of capable of forming a compact layer. The same technique may be used for forming the chromium oxide layer. Further, a layer forming method wherein chromium reacts with oxygen to form chromium oxide can preferably be used.

Then, a photoresist is coated on the multi-layer of chromium and chromium oxide by a spin coating or the like, and light is exposed to the photoresist to obtain a predetermined pattern. After the exposure, etching is conducted to the multi-layer to remove chromium and chromium oxide to form a non-transmitting layer on the substrate, whereby the photomask can be obtained.

The layer thickness of each layer which forms the non-transmitting layer of the multi-layer of chromium and chromium oxide can be such one capable of obtaining sufficient non-transmitting properties (light shielding effect to energy beams) and a predetermined reflectivity although the thickness varies depending on the compactness of each layer, i.e., a layer forming method used. Generally, it is preferable that the thickness of the chromium layer is in a range of from 20 nm to 200 nm and the thickness of the chromium oxide layer is in a range of from 20 nm to 200 nm.

In the thus formed photomask having the non-transmitting layer, projecting portions are provided by the presence of the non-transmitting layer. As shown in FIG. 1(a), the photomask 102 is disposed so that the surface with the non-transmitting layer 102B faces the magnetic disk 101. The surface of the photomask 102 on which the non-transmitting layer 102B is formed may be formed flat by filing a material capable of transmitting energy beams therethrough in recessed portions between adjacent projecting portions of the non-transmitting layer 102B.

Figure 2B:
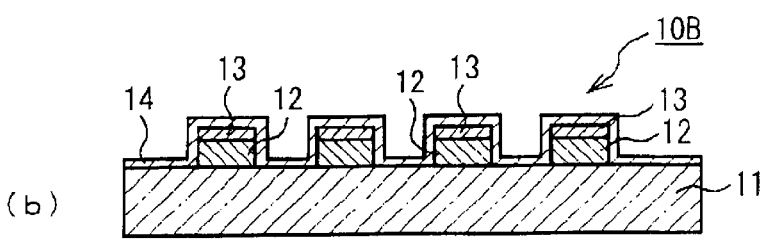

It is desirable that the outermost layer of the photomask is covered with a dielectric layer. For example, a photomask 10B having the surface, facing the magnetic recording medium, on which a chromium layer 12 and a chromium oxide layer 13 are formed, is covered with a dielectric layer 14 as shown in FIG. 2(b), may be used.

Figure 2C:
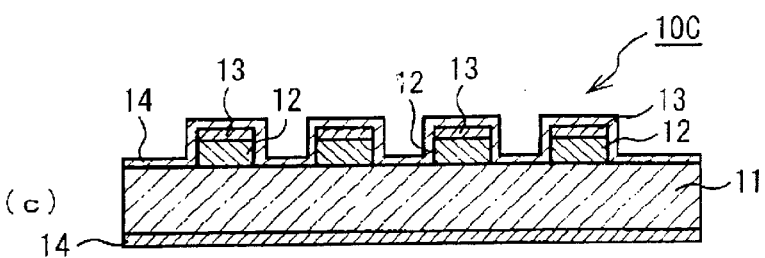

When the dielectric layer is used as the outermost layer of the surface of the non-transmitting portion facing the magnetic recording medium, the reflection of laser beams can preferably be reduced. Further, when the dielectric layer is used as the outermost layer of the surface of the transmitting portion facing the magnetic recording medium as shown in FIG. 2(c), the reflection of laser beams at the surface of the substrate such as glass can preferably be prevented. Further, a photomask 10C in which a dielectric layer 14 is formed as the outermost layer of the surface, on the opposite side of the magnetic recording medium, of the photomask can preferably reduce the reflection.

In this case, the kind, the thickness, the method for forming etc. of the dielectric layer 14 vary depending on wavelengths to be used. Generally, the dielectric layer is required to have a high permeability to a wavelength of energy beam used, a suitable refractive index and a high melting point durable to the radiation of energy beams, and an oxide, sulfide or nitride of a metal or a semiconductor material, or a fluoride of Ca, Mg, Al, Li or the like may be used. These oxide, sulfide, nitride and fluoride are not always necessary to have a stoichiometric composition. It is effective to control the composition to adjust the refractive index and so on, and to use a mixture of these materials.

For example, a layer or two or more layers may be formed by using a material selected from the group consisting of $MgF_2$, $ThOF_2$, $SiO_2$, $SiO$, $TiO_2$, $Ta_2O_5$, $ZrO_2$, $CeO_2$, $MoO_2$, $Al_2O_3$, $La_2O_3$, $Cu_2O$, $WO_3$, $Si_3N_4$, $ZnS$, $ZnSe$, $CdS$, $CdSe$, $InS$ or the like. In particular, $MgF_2$, $ThOF_2$, $SiO_2$, $TiO_2$, $CeO_2$, $Al_2O_3$ or $ZnS$ is usable. The material for this dielectric layer may be a composite dielectric material including two or more kinds of these materials, and the proportion is optional and can be selected depending on purposes.

For example, when the wavelength of energy beams is 248 nm, and $MgF_2$ is selected as the dielectric material, the refractive index of $MgF_2$ is about 1.4. Accordingly, a layer having a reflectivity of about 1.6% can be obtained by forming a $MgF_2$ layer in a thickness of about 45 nm.

In a case of reducing further the reflectivity, it is necessary to form a multi-layer by a plurality of dielectric layers. For example, in forming dielectric layers of $SiO_2$ and $TiO_2$ wherein the refractive index of $TiO_2$ is about 2.4 and the refractive index of $SiO_2$ is about 1.5, a layer having a reflectivity of substantially 0% can be formed theoretically by forming a $TiO_2$ layer in a thickness of 6.6 nm and forming thereon a $SiO_2$ layer in a thickness of 56.9 nm when energy beams having a wavelength of 248 nm is used.

These dielectric layers can be formed by sputtering or vapor deposition. It is desirable for the dielectric layers to have each a refractive index n and an attenuation coefficient k uniformly. In order to form a double-layered structure of dielectric layer, it is necessary to reduce a stress in a thin layer so that durability to energy beams can be increased. For this, it is preferable to form a layer having compression stress properties and a layer having tensile stress properties. For example, $SiO_2$ exhibits compression stress properties and $TiO_2$ exhibits tensile stress properties. It is important to minimize impurities in the layers as possible in order to increase the durability further. Also it is important to keep uniformity of the films constant in a thickness direction.

In the method for forming the dielectric layer for anti-reflection, a coating layer which can reduce substantially the reflection of light to a specified wavelength is called a V coat layer. When laser is used as energy beams, use of the V coat layer is preferable because of its having mono-wavelength properties.

When energy beams in an ultraviolet region (wavelength: 200–300 nm) are used for the substrate of quartz glass, the reflectivity is about 5% of incident light. By forming the dielectric layer, the reflectivity can preferably be decreased to 1% or less, in particular, 0.5% or less, whereby the modulation can be remarkably improved.

Figure 2D:
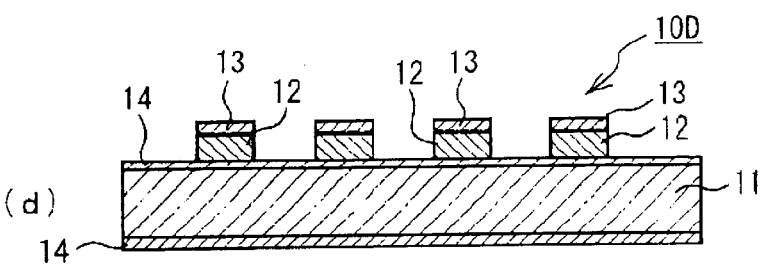

Further, a photomask 10D as shown in FIG. 2(d) may be formed by using the method as follows. A dielectric layer 14 is formed on the substrate: a chromium layer 12 and a chromium oxide layer 13 are successively formed on the dielectric layer; a photoresist is coated by spin coating or the like; exposure to light is conducted to form a predetermined pattern, and the chromium layer 12 and the chromium oxide layer 13 are etched according to a predetermined pattern to leave the dielectric layer 14. Preferably, both main surfaces of a photomask 10C should be covered with a dielectric layer 14 to reduce the reflectivity over the entire main surfaces as shown in FIG. 2(c).

Figure 2E:
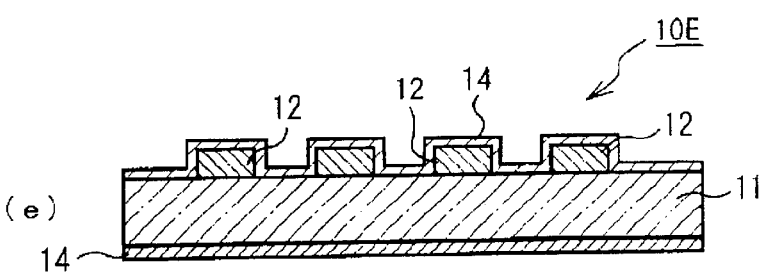

In a case of forming the dielectric layer on the chromium layer, it is always unnecessary to cover the chromium layer by another layer such as the chromium oxide layer. A photomask 10E in which the entire main surfaces of a quartz glass substrate 11 with a chromium layer 12 are covered with a dielectric layer 14 as shown in FIG. 2(e), may be used. Since the photomask 10E in which the dielectric layer 14 covers its main surfaces is used, the reflection can be suppressed and a sufficient effect is obtainable.

The photomask is not always necessary to have the above-mentioned layer structure but another layer may be interposed between the layers according to requirement.

In a case of forming a magnetic pattern by using the above-mentioned photomask and according to the method as shown in FIG. 1, it is preferable that the photomask 102 is disposed with a space or a distance of 1 mm or less (the space S in FIG. 1(a)) between the photomask and the magnetic recording medium 101. If the space is larger than such value, the diffraction of energy beams is large and the magnetic pattern is apt to be unclear.

It is preferable that the space between the photomask 102 and the magnetic recording medium 101 is 0.1 μm or more so that a possible flaw or defect in the magnetic recording medium 101 or the mask 102 due to the deposition of dust or the like can be eliminated. If the space is less than 0.1 μm, there causes an unexpected contact between the photomask 102 and a magnetic pattern forming portion due to a wave undulation in the surface of the magnetic recording medium 101, whereby the photomask 102 or the magnetic recording medium 101 may be damaged. Further since there is a change in the thermal conductivity of the medium in the contact portion, the magnetization properties change in this contact portion, whereby a predetermined pattern may not be obtained.

In a case that a lubricant layer is provided on the magnetic recording medium 101 before the formation of the magnetic pattern, it is preferable to form a space of 0.1 μm or more between the photomask 102 and the magnetic recording medium 101 in order to prevent lubricant from depositing on the photomask 102. The space is more preferably 0.2 μm or more.

As the method for keeping a certain space between the photomask 102 and the magnetic pattern forming area of the magnetic recording medium 101, any method can be used as far as it can keep the both members at a predetermined distance. For example, a spacer 122 may be inserted at a position other than the magnetic pattern forming area between the both members as shown in FIG. 1(a). As another method, a specified tool to keep the photomask and the magnetic recording medium at a predetermined distance may be used. Further, the spacer may be formed integrally with the photomask. When a spacer or spacers are provided between the photomask and the magnetic recording medium in an outer peripheral portion and/or an inner peripheral portion of the magnetic pattern forming area of the medium, it or they can correct the undulation of the surface of the magnetic recording medium, whereby the accuracy in forming the magnetic pattern can preferably be increased.

Material for the spacer 122 should be hard. Further, it is preferable that the material for the spacer is not easily magnetized because an external magnetic field is used for forming the pattern. Metal such as stainless steel or copper or resin such as polyimide is preferably used. The height of the space 122 is so selected that a predetermined space S can be formed between the photomask 102 and the magnetic recording medium 101. The height is generally from several μm to several hundred μm although it is optional.

The space between the photomask 102 and the magnetic recording medium 101 can be measured by using, for example, an interference fringe. Specifically, laser beams are irradiated to the magnetic recording medium 101 through the photomask 102 to detect whether or not the space between the photomask and the medium is equal over the entire opposing surfaces based on the number, distance and position of an interference fringe(s) appearing on the medium surface. Further, on the basis of a result obtained, the space between the mask and the medium can further be made uniform by changing the height and the position of the spacer(s).

In the present invention, it is preferable that the substrate for the photomask 102 has a degree of flatness of 3 μm or less in at least a pattern forming area. As described above, the space between the mask and the medium is kept uniform by using the spacer(s). However, there is a possibility that the space is not uniform, or the both members contact with each other even when the height of the spacer is constant, if the medium or the mask has a large undulation. For this, the degree of flatness of the substrate for the photomask is preferably 3 μm or less in at least the pattern forming area. The degree of flatness should be small as possible, and has no lower limit. However, the flatness is about 0.01 μm in a lower limit.

It is preferable that the magnetic recording medium has also a small degree of flatness. However, since the mask is generally thick and rigid in comparison with the medium, the flatness of the medium can be reduced to the same extent as the mask by drawing the photomask toward the magnetic recording medium through the spacer(s) even when the medium has a small amount of undulation. Accordingly, the rigidity of the substrate for the photomask is a important factor.

In the present invention, various kinds of method can be considered in the combination of a step of heating locally a magnetic layer by using the above-mentioned photomask and a step of applying an external magnetic field to the magnetic layer. For example, the following methods may be used.

Method 1: Before heating, a strong external magnetic field is applied to a magnetic layer to magnetize it uniformly in a desired direction, and then, a desired portion of the magnetic layer is heated to a temperature or higher at which the coercive force of the magnetic layer decreases to erase magnetism, whereby a magnetic pattern is formed. In this method, the magnetic pattern can be formed by the easiest way. Further, since the magnetic layer is magnetized uniformly, magnetic recording can be conducted as usual after the magnetic pattern has been formed by this method.

Method 2: Before heating, a strong external magnetic field is applied to a magnetic layer to magnetize it uniformly in a desired direction, and then, a desired portion of the magnetic layer is heated to a temperature or higher at which the coercive force of the magnetic layer decreases, and at the same time, a weak magnetic field is applied to that portion to thereby erase magnetism, whereby a magnetic pattern is formed. In this method, the perfect erasing is obtainable, and therefore, a magnetic pattern capable of producing strong signals can be obtained.

Method 3: Heating a magnetic layer to a temperature or higher at which the coercive force of the magnetic layer decreases, and at the same time, applying a weak external magnetic field to thereby magnetize only the heated portion in a direction along the external magnetic field, whereby a magnetic pattern is formed. In this method, the magnetic pattern can be formed by the easiest way. Further, the external magnetic field to be applied may be weak.

Method 4: Before heating, a strong external magnetic field is applied to a magnetic layer to magnetize it uniformly in a desired direction, and then, a desired portion is heated to a temperature or higher at which the coercive force of the magnetic layer decreases, and at the same time, a weak magnetic field is applied to it in a direction opposite to the direction before the heating to thereby magnetize the portion, whereby a magnetic pattern is formed. In this method, a magnetic pattern capable of producing the strongest signals and excellent C/N and S/N are obtainable. Accordingly, this method is the most preferable.

In the following, each of the methods will be described in detail.

The direction of the external magnetic field in Method 1 varies depending on kinds of magnetic layer used for the magnetic recording medium. In a case of using a magnetic recording medium in which the easily magnetizable axis extends in a longitudinal direction, the external magnetic field should be applied to the magnetic layer so that the magnetic layer is magnetized in the same or opposite direction to the direction of moving the data writing/reproducing head (the direction of moving relatively the head to the medium). Further, when the magnetic recording medium had a circular plate-like shape, the external magnetic field may be applied so that the magnetic layer is magnetized in its radial direction. In a case of using a medium in which the easily magnetizable axis extends vertically with respect to the longitudinal direction, the external magnetic field is applied so that the magnetic layer is magnetized in an upper or lower direction with respect to the vertical direction.

The intensity of the magnetic field varies depending on the characteristics of the magnetic layer of the magnetic recording medium. It is preferable that the magnetic layer is magnetized by a magnetic field having an intensity twice as much as the coercive force of the magnetic layer at room temperature. When it is weaker than that value, magnetization may be insufficient. However, the magnetization should be carried out with an external magnetic field of about 5 times or less as much as the coercive force of the magnetic layer at room temperature in consideration of the performance of a magnetization device used for applying the magnetic field.

In Method 2, the direction and intensity of the external magnetic field applied before the heating are the same as those in Method 1.

The direction of the magnetic field applied at the same time of the heating is a direction perpendicular to the longitudinal direction in a case of using a medium in which the easily magnetizable axis extends in the longitudinal direction, or a longitudinal direction of the medium in a case that the easily magnetizable axis extends perpendicular to the longitudinal direction. Thus, the erasing of magnetization is conducted by applying the magnetic field.

Further, the intensity of the magnetic field varies depending on the characteristics of the magnetic layer of the magnetic recording medium. However, the intensity of the applicable magnetic field should be smaller than the coercive force of the magnetic layer at room temperature. It is preferable to apply a magnetic field having an intensity of $\frac{1}{8}$ or more of the coercive force of the magnetic layer at room temperature. When it is lower than that value, the heated portion may be magnetized again in the same direction as in its circumferential portion due to the influence of magnetic field by the magnetic domains around the heated portion when the heated portion is cooled.

However, the intensity of the applicable magnetic field is preferably two times or less as much as the coercive force of the magnetic layer at room temperature. When it has a greater value, the magnetic domains around the heated portion may also be influenced. In a case of applying a magnetic field having an intensity of $\frac{2}{3}$ or more as much as the coercive force at room temperature, the magnetic field should be applied in a pulse form so that influence to the non-heated area can be suppressed.

The heating should be controlled to a temperature at which reduction in the coercive force of the magnetic layer is found. Preferably, the magnetic layer should be heated at 100° C. or higher. The magnetic layer, which suffers easily the influence of an external magnetic field at a heating temperature of 100° C. or lower, tends to show a low stability of magnetic domains at room temperature. However, the heating temperature is desirable to be low in a range capable of obtaining a predetermined reduction of coercive force. If the heating temperature is too high, the diffusion of heat to an area other than the desired area for heating is apt to occur whereby there is a possibility of making the magnetic pattern unclear. Further, there is a possibility that the magnetic layer is deformed. Therefore, the heating temperature is preferably around Curie temperature or lower, more preferably 400° C. or lower, especially preferably, 300° C. or lower.

In Method 3, the direction of the external magnetic field applied at the same time of the heating varies depending on kinds of magnetic layer of the magnetic recording medium. When a medium having the easily magnetizable axis extending in a longitudinal direction is used, the external magnetic field should be applied to the magnetic layer so that the magnetic layer is magnetized in the same or opposite direction to the direction of moving the data writing/reproducing head (the direction of relative movement of the medium to the head). When a medium having a circular plate-like shape is used, the external magnetic field may be applied so that the magnetic layer is magnetized in its radial direction. When a medium having the easily magnetizable axis extending perpendicular to the longitudinal direction is used, the magnetic field should be applied to the magnetic layer so that it is magnetized in an upper or lower direction with respect to the perpendicular direction.

The intensity of the magnetic field is the same as the intensity of the external magnetic field applied together with the heating in Method 2. Further, the heating temperature is also the same as that in Method 2.

In Method 4, the direction and intensity of the external magnetic field applied before the heating are the same as those in Method 1.

Although the intensity of the magnetic field applied together with the heating is the same as that in Method 2, the direction of the magnetic field is opposite to the direction before the heating, so that the magnetic layer is magnetized locally in the opposite direction. The heating temperature is the same as in Method 2.

In the next, explanation will be made as to energy beams used in the present invention.

It is preferable to form the energy beams into pulsed energy beams rather than continuous irradiation of beams, in order to control the position of a heated portion and the heating temperature. In particular, use of a pulsed laser source is preferable. The pulsed laser source is to oscillate intermittently laser in a state of pulse, and is very preferable because laser having a high peak value of power can be irradiated in a very short time, and a storage of heat seldom occurs, in comparison with the case that continuous laser is changed to pulsed laser by using an optical device such as an acoustic optical device (AO) or an electro-optical device (EO).

When the continuous laser is changed to pulsed laser by such optical device, the magnitude of the power of pulsed laser is substantially equal over its pulse width. On the other hand, in the pulsed laser source, for example, energy is stored by resonance in the pulsed laser source, and laser beams are emitted as a pulse at a time. Accordingly, the power of a pulse is very large at its peak, and decreases after then. In the present invention, use of the pulsed laser source is suitable because in the formation of a magnetic pattern having a high contrast and high accuracy, it is preferred to heat quickly and to cool quickly.

The medium surface in which a magnetic pattern is formed should have a large difference of temperature between an irradiation time and a non-irradiation time of pulsed energy beams in order to increase the contrast ratio of the pattern or increase the recording density. Accordingly, the medium surface is preferably at room temperature or lower in a non-irradiation time of pulsed energy beams. Here, the room temperature is about 25° C.

It is preferred that the wavelength of the energy beams for irradiation is 1,100 nm or less. When the energy beams have a short wavelength of 1,100 nm or less, a fine magnetic pattern can easily be formed because a diffraction effect is small and the resolution is increased. More preferably, the wavelength of the energy beams is 600 nm or less. Such wavelength gives not only a high resolution but also a small diffraction whereby the space between the mask and the magnetic recording medium can be relatively wide, hence, handling is easy, and the assembling of a magnetic pattern forming device is easy. Further, the wavelength of the energy beams is preferably 150 nm or more. When it is less than 150 nm, the absorption of heat by synthesized quartz used for the transparent substrate for the photomask is large, and insufficient heating may be caused. In particular, when the wavelength is 350 nm or more, optical glass can be used for the transparent substrate for the photomask.

As the energy beams, specifically, excimer laser (248 nm), a second harmonic wave (532 nm), a 3rd harmonic wave (355 nm) or a 4th harmonic wave (266 nm) of Q-switch laser of YAG (1,064 nm), Ar laser (488 nm, 514 nm) or ruby laser (694 nm) can be used.

It is preferable that the power of the pulsed energy beams per pulse is 1,000 mJ/cm$^2$ or less. The application of a larger power than that of the above value may damage the surface of the magnetic recording medium by the pulsed energy beams, or may cause deformation. When the surface roughness Ra of the magnetic recording medium becomes 3 nm or more, or the degree of undulation Wa is increased to 5 nm or more by the deformation of the magnetic recording medium, a trouble may be caused in the movement of the flying/contact head.

Therefore, the power of the pulsed energy beams per pulse is preferably 500 mJ/cm$^2$ or less, more preferably, 200 mJ/cm$^2$ or less. In this range, a magnetic pattern having a high resolution is easily formed even in a case of using a substrate having relatively large thermal diffusion properties as a non-magnetizable substrate for the magnetic recording medium. Further, the power is preferably 10 mJ/cm$^2$ or more. When it is smaller than that value, temperature rise in the magnetic layer is suppressed and there is little possibility of the occurrence of magnetic transfer. Since the diffraction effect of energy beams varies depending on widths of the magnetic pattern, the optimum power is also changed depending on widths of the pattern. Further, as the wavelength of the energy beams is shorter, an upper limit of the applicable power tends to decrease.

Further, when there is a fear that the magnetic layer, the protective layer or the lubricant layer of the magnetic recording medium may be damaged by the energy beams, it is possible to take a way to decrease the power of the pulsed energy beams and to increase the intensity of a magnetic field applied at the same time of the application of the pulsed energy beams. For example, in a case of using a medium of longitudinal recording type, a magnetic field having an intensity as large as 25–75% of the coercive force of the magnetic layer at room temperature is applied to thereby reduce the irradiation energy. In a case of a medium of perpendicular recording type, an intensity as large as 1–50% of the coercive force at room temperature should be applied to thereby reduce the irradiation energy.

When the pulsed energy beams are irradiated to the magnetic layer through the protective layer and the lubricant layer, there may be necessary that a lubricant layer is coated on again after the irradiation in consideration of a damage (decomposition, polymerization) to the lubricant.

It is desirable that the pulse width of the pulsed energy beams is 1 $\mu$sec or less. When the pulse width is wider than the value, heat caused by the energy of the pulsed energy beams disperses in the magnetic disk whereby the resolution is apt to decrease. When the power per 1 pulse is equal, the pulse width should be made short so as to generate a strong energy at a time whereby the dispersion of heat can be made small and the resolution of a magnetic pattern tends to increase. More preferably, the pulse width of the pulsed energy beams is 100 nsec or less. Within that range, it is easy to form a magnetic pattern having a high resolution even when a substrate made of metal such as Al having a relatively large thermal dispersion is used as a non-magnetizable substrate for the magnetic recording medium. In forming a magnetic pattern having the minimum width of 2 $\mu$m or less, it is preferred to determine the pulse width of the pulsed energy beams to be 25 nsec or less. Namely, in considering the resolution significantly, the pulse width should be short as possible. Further, the pulse width is preferably 1 nsec or more because it is preferable that the heating is kept until reversal magnetization in the magnetic layer of the magnetic recording medium is completed.

As a kind of the pulsed energy beams, there is laser capable of generating at a high frequency ultra-short pulses in a level of pico sec or femto sec such as mode lock laser. In a period in which ultra-short pulses are irradiated at a high frequency, the laser is not irradiated in a very short time between each ultra-short pulse. However, since the non-irradiation time is very short, the portion to be heated is not substantially cooled. Namely, when an area has once been heated to a predetermine temperature or higher, the area can be kept to a temperature higher than the predetermined temperature. In such case, accordingly, a continuous irradiation period (a continuous irradiation period including a non-irradiation time between ultra-short pulses) is determined as 1 pulse. Further, the integration value of irradiation energy quantity in the continuous irradiation period is determined as power (mJ/cm$^2$) per pulse.

In the present invention, the intensity distribution of energy beams in an energy irradiation area is preferably within 15%. By controlling the intensity distribution, the distribution of heat in the energy beam-irradiated area can be suppressed to be small, and the intensity distribution of magnetism of a magnetic pattern can be suppressed to be small. Accordingly, a magnetic pattern having a highly uniform intensity of signal can be formed when the signal intensity is read by using a magnetic head.

Energy beams such as laser have generally an intensity distribution (a density distribution of energy) at a beam spot. Even when the energy beams are irradiated to heat a local portion, there arises a different of temperature rise due to differences of energy density. Therefore, there occurs locally a difference of intensity of printing due to uneven heating. Generally when pulsed laser such as excimer laser or YAG-Q-switch laser is used, the intensity distribution at a beam spot (an area of medium surface which is subjected to irradiation at a time) is very large.

In the present invention, accordingly, it is preferable to use an energy beam source having a small intensity distribution, or conducting an intensity distribution equalizing treatment to the energy beams, whereby the intensity distribution of energy beams at the beam spot is controlled to be within 15%.

As the intensity distribution equalizing treatment to the energy beams, there is, for example, a method for equalizing with use of a homogenizer, or a method for transmitting only a portion having a small intensity distribution of energy beams through a shading plate or a slit, and the transmitted portion is expanded thereafter according to requirement. Preferably, the energy beams may be subjected to an equalizing treatment by optically dividing the energy beams into a plurality of portions and then, overlaying the divided portions. In this case, the energy beams can be utilized thoroughly and efficiently. In the present invention, it is desirable to irradiate energy beams of high intensity in a short time to heat the magnetic layer. For this purpose, it is preferable to use energy without loss.

There is a case that magnetic layers are formed on both principal surfaces of the substrate of a magnetic recording medium. In this case, the formation of the magnetic pattern may be conducted for each principal surface sequentially, or for both surfaces simultaneously. In the later case masks, an energy irradiation system and means for applying an external magnetic field are arranged at both sides of the magnetic recording medium.

In a case that two or more magnetic layers are formed on a single surface and when each different pattern is to be formed in each magnetic layer, irradiated energy beams should be focused to each layer and each layer be heated separately, so that individual patterns can be formed.

In forming a magnetic pattern, it is preferred to use a structure for preventing re-irradiation of energy beams by disposing a shading plate capable of blocking selectively energy beams in an area where irradiation is undesirable, between the energy beam source and the photomask or between the photomask and the magnetic recording medium.

For the shading plate, such one blocking a specified wavelength of used energy beams is sufficient, or it is sufficient to reflect or absorb the energy beams. However, it is preferable that the plate has a good thermal conductivity and a high reflectivity because heat is generated by the absorption of energy beams whereby the heat affects adversely in forming a magnetic pattern. For example, a metallic plate such as Cr, Al, Fe or the like may be used.

Next, explanation will be made as to the external magnetic field.

When the magnetic recording medium is a circular plate-like medium, it is preferable that the direction of applying an external magnetic field is any one among a circumferential direction, a radial direction and a direction perpendicular to the plate surface.

When the external magnetic field is applied together with the heating, the application of the external magnetic field may be carried out over a wide area as heated. By this, a plurality of magnetic patterns can be formed at a time. When pulsed energy beams are used, the external magnetic field may be applied continuously or in a pulse-like form.

As means for applying the external magnetic field to the magnetic layer of magnetic recording medium, a magnetic head may be used, or a plurality of electromagnets or permanent magnets may be arranged so as to generate a magnetic field in a predetermined magnetization direction. Further, a combination of different means as mentioned above may be used. In order to magnetize efficiently a medium having a high coercive force which is suitable for high density recording, a permanent magnet such as a magnet of ferrite, a magnet of neodymium type rare earth, a magnet of samarium-cobalt type rare earth or the like is preferable.

In the magnetic recording medium in which a magnetic pattern is formed by using the photomask of the present invention and according to the method of the present invention, influence by an interference fringe can be suppressed and a fine magnetic pattern with a small modulation of reproducing signals can be formed accurately. Further, a pattern having a small magnetic transition width, a very steep magnetic transition at the boundary of magnetic domains and a high quality of output signals can be formed. Further, a magnetic pattern can be formed easily in a very short time. In addition, since it is unnecessary to bring the magnetic recording medium into close contact with the master disk in the pattern forming step unlike the conventional technique, the possibility of causing a damage or a defect is very little.

As recording density becomes high, the writing of servo signals is difficult, and the recording of servo signals creates the main cause of pushing up manufacturing cost. Accordingly, when the present invention is applied to a medium for high density recording, a large effect can be provided. Further, the present invention can easily be applicable to a perpendicular magnetic recording medium because it is easy to apply the magnetic field in the perpendicular type medium.

Accordingly, when the technique according to the present invention is used for a manufacture line for producing magnetic recording media, a magnetic recording medium in which a high accurate magnetic pattern for controlling a head is formed, can be produced economically in a short time.

Next, the structure of the magnetic recording medium of the present invention will be described.

A non-magnetic substrate used for the magnetic recording medium of the present invention should not cause vibrations even in a high revolution speed at the time of recording/reproducing signals at a high speed, and therefore, a hard substrate is usually used. In order to obtain a sufficient rigidity against vibrations, the thickness of the substrate is preferably 0.3 mm or more. However, a thicker substrate is contrary to a demand of reducing the thickness of a magnetic recording device. Accordingly, 3 mm or less is preferable. For example, an alloy substrate containing Al as the main component, such as an Al—Mg alloy substrate, an alloy substrate containing Mg as the main component, such as a Mg—Zn alloy substrate, a substrate composed of material such as usually used soda glass, aluminosilicate glass, non-crystalline glass, silicon, titanium, ceramics or various resins, or a substrate produced by combining such materials, may be used. In particular, it is preferred to use the Al alloy substrate, a substrate made of glass such as crystallized glass from the viewpoint of strength, or a substrate made of resin from the viewpoint of cost.

As described above, the present invention is in particular effective in the application to a magnetic recording medium having a hard substrate. In the conventional magnetic printing method, since the medium having a hard substrate was poor in the contacting strength to the master disk, a flaw or a defect may be produced, or the boundary of printed magnetic domains was unclear, so that the half value width might expand. On the other hand, the present invention does not create such problem because the photomask does not press-contact with the medium. In particular, the present invention can effectively be used for a medium having a glass substrate in which cracks are apt to occur.

In usual manufacturing steps for a magnetic recording medium, washing and drying are generally conducted to the substrate. It is desirable also in the present invention that washing and drying are conducted before the formation of layers in order to keep the contacting properties of each layer.

In manufacturing the magnetic recording medium of the present invention, a metallic layer such as NiP or the like may be formed on the substrate surface. As the method for forming the metallic layer, a thin film forming technique such as an electroless plating method, a sputtering method, a vacuum deposition method, CVD method and so on may be used. When a substrate made of an electric conductive material is used, electrolytic plating may be used. The thickness of the metallic layer is preferably 50 nm or more. However, in consideration of productivity for magnetic recording media, the thickness is preferably in a range of from 50 to 500 nm, more preferably, from 50 to 300 nm.

Further, it is desirable to form the metallic layer on the entire substrate surface. However, it is possible to form it only a part, for example, only an area where texturing, which will be explained later, is conducted.

Further, the texturing may be conducted concentrically on the substrate surface or on the metallic layer formed on the substrate. In the present invention, "concentrically texturing" indicates a state that a large number of fine grooves are formed in a circumferential direction of the substrate by grinding the substrate in the circumferential direction by employing, for example, mechanical texturing with abrasive grain and a texture tape, texturing using laser beams or by the combination of these techniques.

As the abrasive grain for the mechanical texturing, a diamond grain, in particular, such grain having graphatized surface, is most preferable. As another grain used for the mechanical texturing, an alumina grain is widely used. However, the diamond grain exhibits excellent performance from the viewpoint that a longitudinally oriented medium has its nature to provide the easy magnetization axis oriented along texturing grooves.

The substrate surface, even though its surface roughness (Ra) takes any value, does not basically influence the effect of the present invention. However, from the viewpoint that the upmost reduction of the flying height of the head is advantageous in order to realize high density recording, the surface roughness Ra of the substrate surface is preferably 2 nm or less, more preferably, 1 nm or less, particularly preferably, 0.5 nm or less. The surface roughness Ra is a value obtained by measuring the surface over a length of 400 $\mu$m with a contact finger type surface roughness meter and calculating the measured value according to JIS B0601. In this case, the size of the end of the finger used for measuring is about 0.2 $\mu$m.

On the substrate which is subjected to washing, drying and the formation of the metallic layer and concentrically texturing which are conducted according to requirement, as described above, a magnetic layer (magnetic recording layer) is formed. An underlayer may be formed prior to the formation of the magnetic layer. The underlayer is to make the crystal fine and to control the orientation of the crystal face. For this purpose, material containing Cr as the main component is preferably used.

As the material for the underlayer containing Cr as the main component, pure Cr, or in addition to pure Cr, the material including an alloy composed of at least one element selected from the group consisting of V, Ti, Mo, Zr, Hf, Ta, W, Ge, Nb, Si, Cu and B, or chromium oxide may be mentioned in order to obtain good crystal matching to the recording layer.

Among them, pure Cr or an alloy obtained by adding to Cr one or more than two elements selected from the group consisting of Ti, Mo, W, V, Ta, Si, Nb, Zr and Hf is preferable. The contents of the second and third elements, although the optimum amounts vary depending on elements used, are preferably from 1 atomic % to 50 atomic % in general, more preferably, from 5 atomic % to 30 atomic %, further preferably, from 5 atomic % to 20 atomic %.

The thickness of the underlayer should have such a thickness being sufficient to realize the anisotropy, and is preferably from 0.1 to 50 nm, more preferably, from 0.3 to 30 nm, further preferably, from 0.5 to 10 nm. When the underlayer containing Cr as the main component is formed, the substrate may be or may not be heated.

A soft magnetic layer may be formed between the underlayer and the recording layer depending on conditions. The soft magnetic layer gives a large effect, and is preferably used for, in particular, a keeper medium with small magnetic transition noises or a perpendicular recording type medium wherein magnetic domains orient in a direction perpendicular to a longitudinal direction of the medium.

The soft magnetic layer is preferably made of material having relatively high magnetic permeability and a small magnetic loss. However, material of NiFe alloy or an alloy added with Mo or the like as the third element is preferably used. The optimum magnetic permeability varies largely depending on the characteristics of the head or the magnetic layer used for recording data. Generally, the maximum magnetic permeability of about 10–1,000,000 (H/m) is preferred.

Further, a CoCr series interlayer may be formed on the Cr underlayer.

In forming the magnetic layer, a layer made of the same material as the underlayer or a layer made of a non-magnetic material may be interposed between the magnetic layer and the soft magnetic layer. When the magnetic layer is formed, the substrate may be or may not be heated.

As the magnetic layer, a magnetic layer of Co alloy, a rare earth type magnetic layer represented by TbFeCo or a multi-layer of a transition metal and a noble metal such as a multi-layer of Co-pd layers is preferably used.

As the magnetic layer of Co alloy, pure Co or a magnetic material of Co alloy, which is generally used for a magnetic material, such as CoNi, CoSm, CoCrTa, CoNiCr or CoCrPt is generally used. Further, an element such as Ni, Cr, Pt, Ta, W or B or a compound such as $SiO_2$ may be added to the above-mentioned Co alloy. For example, CoCrPtTa, CoCrPtB, CoNiPt, CoNiCrPtB or the like may be mentioned. The thickness of the magnetic layer of Co alloy is preferably 5 nm or more, more preferably, 10 nm or more, although the thickness is optional. Further, the thickness is preferably 50 nm or less, more preferably, 30 nm or less. Two or more magnetic layers may be formed by interposing an appropriate non-magnetic interlayer or without any interposing layer. In this case, the composition of the magnetic material to be laminated may be same or different.

As the magnetic material for a rare earth type magnetic layer, such one which is usually used, may be employed. For example, TbFeCo, GdFeCo, DyFeCO or TbFe may be mentioned. Tb, Dy or Ho may be added to such rare earth alloy. Ti, Al or Pt may be added for the purpose of preventing the deterioration by oxidation. Although the thickness of the rare earth type magnetic layer is optional, a thickness of about 5–100 nm is usually used. Further, two or more magnetic layers may be formed directly, or by interposing an appropriate non-magnetic interlayer. The composition of the magnetic material to be laminated may be same or different. In particular, the rare earth type magnetic layer is a layer having an amorphous structure. Since this magnetic layer is capable of magnetizing vertically to the medium surface, it can be used for high density recording. Accordingly, the method of the present invention capable of forming a magnetic pattern with high density and high accuracy is effectively applicable.

The multi-layer made of transition metal and noble metal, which is capable of perpendicularly magnetic recording as well, may be of a usual magnetic material, such as Co/Pd, Co/Pt, Fe/Pt, Fe/Au or Fe/Ag. The transition metal and the noble metal for the multi-layer are not always necessary to be pure but may be an alloy containing such material as the main component. The thickness of the multi-layer is usually about 5–1,000 nm although it is optional. Further, the multi-layer may be formed of three or more kinds of material according to requirements.

In the present invention, the magnetic layer as the magnetic recording layer can keep magnetism at room temperature, and is demagnetized by heat or is magnetized by applying an external magnetic field together with heating.

It is necessary that the coercive force of the magnetic layer at room temperature keeps magnetism at room temperature, and is magnetized uniformly with an appropriate external magnetic field. By rendering the coercive force of the magnetic layer at room temperature to be 2,000 Oe or more, a medium having small magnetic domains and suitable for high density recording is obtainable. More preferably, the coercive force is 3,000 Oe or more.

In the conventional magnetic printing method, it was difficult to print a pattern in a magnetic recording medium having an excessively high coercive force as described above. However, the present invention can suitably be applied to such medium having a large coercive force because a magnetic pattern is formed by heating the magnetic layer to thereby decrease sufficiently the coercive force.

However, the coercive force of the magnetic layer at room temperature is preferably 20 kOe or less. When it exceeds 20 kOe, a large external magnetic field is required to magnetize the magnetic layer in a lump. Further, there is a possibility that the usual magnetic recording is difficult. The coercive force is more preferably 10 kOe or less.

It is necessary for the magnetic layer to keep magnetism at room temperature and to be magnetized with a weaker external magnetic field at an appropriate heating temperature. Further, magnetic domains of a magnetic pattern can be made clear by increasing the difference between the room temperature and a magnetization erasing temperature. For this, it is preferable that the magnetism erasing temperature is higher. Specifically, it is preferred to be 100° C. or higher, more preferably, 150° C. or higher. The magnetization erasing temperature exists in the vicinity of Curie temperature (slightly lower than Curie temperature) or in the vicinity of compensation temperature.

The Curie temperature is preferably 100° C. or higher. When it is lower than 100° C., the stability of the magnetic domains at room temperature tends to be low. More preferably, the temperature is 150° C. or higher, more preferably, 20° C. or higher. However, Curie temperature is preferably 700° C. or lower. The reason is that if Curie temperature is too high, it is necessary to increase the heating temperature in order to form the magnetic pattern, and if the magnetic layer is heated excessively, it may be deformed. Further, if the heating temperature is excessively high, the diffusion of heat to an area other than an expected area for heating may take place, whereby the pattern may become unclear.

When the magnetic recording medium is a longitudinal magnetic recording medium, it is difficult, in the conventional magnetic printing method, to conduct saturation-recording to the magnetic recording medium for high density recording having a high coercive force, and to form a magnetic pattern having a high magnetic field intensity. Further, the half value width is also increased. According to the method of the present invention, a desired magnetic pattern can be formed even in a longitudinal recording medium suitable for high density recording. In particular, when the saturation magnetization of the magnetic layer is 50 emu/cc or more, especially, 100 emu/cc or more, the influence of a diamagnetic field is large. Accordingly, the application of the present invention provides a large effect. However, when the saturation magnetization is excessively large, the formation of the magnetic pattern is difficult. Accordingly, 500 emu/cc or less is preferable.

When the magnetic recording medium is a perpendicular magnetic recording medium wherein a magnetic pattern is relatively large and a unit volume of a magnetic domain is large, the saturation magnetization tends to be large and reversed magnetization apt to occur due to a demagnetization effect. This creates noises and deteriorates the half value width. However, the present invention makes it possible to record preferably even for such medium by employing the combination of the soft magnetic layer and the underlayer.

Two or more magnetic layers may be formed in order to increase the capacity of recording. In this case, it is preferred to form another layer therebetween.

Generally, a protective layer is formed on the magnetic layer of the magnetic recording medium. In the present invention, a protective layer made of a hard material is formed on the outermost surface of the magnetic recording medium. The protective layer is to prevent damage to the magnetic layer due to the collision of the magnetic head or the deposition of dust on the layer opposing to the mask. The protective layer protects the magnetic recording medium from contact to the photomask in the application of the magnetic pattern forming method with use of the photomask as in the present invention.

Further, the protective layer is essential in order to prevent the oxidization of the heated magnetic layer, in the present invention. The magnetic layer is generally easily oxidized, and the oxidization is further accelerated by heating. In the present invention, since the magnetic layer is locally heated by energy beams, it is necessary to form previously the protective layer on the magnetic layer in order to prevent the oxidization.

When a plurality of magnetic layers are to be formed, the protective layer should be formed on the magnetic layer formed near the outermost surface. The protective layer may be formed directly on the magnetic layer, or a layer having another function may be interposed according to requirements.

A part of energy beams irradiated in the magnetic pattern forming step in the present invention is absorbed by the protective layer whereby the magnetic layer is locally heated by thermal conduction. If the protective layer is too thick, a magnetic pattern may be unclear by thermal conduction in a lateral direction. Accordingly, the thickness of the protective layer is preferably thin. Further, it is preferred to make the thickness thin for the purpose of reducing the distance between the magnetic layer and the head at the time of reproducing data. Accordingly, the thickness is preferably 50 nm or less, more preferably, 30 nm or less, further preferably, 20 nm or less. However, the thickness is preferably 0.1 nm or more, more preferably, 1 nm or more in order to obtain a sufficient durability.

In forming the protective layer, a layer of carbonic material such as carbon, hydrogenated carbon, nitride carbon, amorphous carbon, SiC or the like, or of a hard material such as $SiO_2$, $Zr_2O_3$, SiN, TiN or the like may be used.

In the magnetic recording medium, it is preferable to form a very hard thin protective layer in order to bring the distance between the head and the magnetic layer close in minimum. Accordingly, a protective layer of carbonic material, in particular, diamond-like carbon is preferable from the viewpoint of not only its having impact resistance, lubricating properties and preventing a damage to the magnetic layer by energy beams, but also its having the function of preventing damage to the magnetic layer caused by the collision of the magnetic head. The magnetic pattern forming method of the present invention is effectively applicable to an opaque protective layer such as the carbonaceous protective layer.

The protective layer may be composed of two or more layers.

When a layer containing Cr as the main component is formed as the protective layer directly on the magnetic layer, it exhibits a remarkable effect to prevent oxygen permeability to the magnetic layer.

On the protective layer, a lubricant layer is formed. The presence of the lubricant layer prevents damage to the magnetic recording medium caused by the contact of the photomask or the magnetic head. As lubricant used for the lubricant layer, a fluorine type lubricant, a hydrocarbon type lubricant and a mixture of these materials are mentioned. The lubricant can be coated on by the usual method such as a dip method, a spin coat method or the like. It is preferred that the thickness of the lubricant layer is thin so as not to hinder the formation of a magnetic pattern, and is preferably 10 nm or less, more preferably 4 nm or less. Further, the thickness is preferably 0.5 nm or more, more preferably, 1 nm or more in order to obtain a sufficient lubricating performance.

In a case of irradiating energy beams from a location above the lubricant layer, lubricant may be applied again on the lubricant layer after the formation of the magnetic pattern by taking account of a damage (decomposition or polymerization) of the lubricant.

The surface roughness Ra of the magnetic recording medium after the formation of the magnetic pattern is preferably kept to 3 nm or less so as not to lose the stability in the movement of moving the flying/contact head. The surface roughness Ra of the medium is a degree of roughness in the medium surface without having a lubricant layer. The value of the surface roughness Ra is obtained by measuring a measurement length of 400 $\mu$m by using the contact finger type surface roughness meter and calculating the obtained value according to JIS B0601. The surface roughness value Ra is preferably 1.5 nm or less.

It is preferable that the surface undulation Wa of the magnetic recording medium after the formation of a magnetic pattern is kept to 5 nm or less. The undulation Wa is an amount of undulation on the medium surface without having a lubricant layer, and it is obtained by measuring a measurement length of 2 mm by using the contact finger type surface roughness meter, and calculating the obtained value according to the calculation of Ra. The value of undulation Wa is preferably 3 nm or less.

In the present invention, various methods can be considered as a layer forming method for forming each layer of the magnetic recording medium. For example, a physically vapor-depositing method such as a DC (magnetron) sputtering method, a high-frequency (magnetron) sputtering method, an ECR sputtering method, a vacuum deposition method and so on are mentioned.

The condition for forming the layers is not in particular limited, and an ultimate vacuum degree, a method for heating the substrate, a substrate temperature, a sputtering gas pressure, a bias voltage and so on are appropriately determined depending on the characteristics of a layer forming device used and the magnetic recording medium to be obtained. For example, in forming a layer by sputtering, an ultimate vacuum degree of $6.7\times10^{-4}$ Pa or less, a substrate temperature of from room temperature to 400° C., a sputtering gas pressure of from $1.3\times10^{-1}$ to $26.6\times10^{-1}$ Pa and a bias voltage of from 0 to $-500$V are generally used.

When the substrate is heated in forming layers, it may be heated before the formation of the underlayer. When a transparent substrate having a low thermal absorption coefficient is used, an underlayer containing Cr as the main component or an underlayer having a B2 crystal structure, which increases the thermal absorption coefficient, may be formed; then, the substrate is heated, and thereafter, a magnetic layer and so on may be formed thereon.

When the magnetic layer is a rear-earth type magnetic layer, it is preferred to use a method that a mask is previously applied to an innermost peripheral portion and an outermost peripheral portion of the disk, layer formation is conducted to the step of forming the magnetic layer, the mask is removed before the formation of the protective layer, and the protective layer is formed to cover entirely the magnetic layer from the viewpoints of preventing corrosion and oxidation. Or when the protective layer comprises double layers, steps until the formation of the magnetic layer and the first protective layer are conducted by using a mask; the mask is removed before the formation of the second protective layer, and the magnetic layer is covered entirely by the second protective layer whereby the corrosion and the oxidation of the rare-earth type magnetic layer can be prevented.

Next, the magnetic recording device according to the present invention will be described.

The magnetic recording device of the present invention comprises a magnetic recording medium in which a magnetic pattern is formed according to the above-mentioned magnetic pattern forming method, driving means for driving the magnetic recording medium in a recording direction, a magnetic head having a recording portion and a reproducing portion, means for moving relatively the magnetic head with respect to the magnetic recording medium, and recording/reproducing signal processing means which supplies a recording signal to the magnetic head and receives a reproducing signal from the magnetic head. As the magnetic head, a flying/contact magnetic head is generally used to perform high density recording.

Such magnetic recording device is capable of high density recording because the magnetic recording medium in which a magnetic pattern such as fine, highly precise servo pattern is formed, is used. Further, use of the medium of flaw-free and less defect lessens errors in recording.

Precise servo signals can easily be obtained by using the magnetic recording device in which after the magnetic recording medium has been assembled in the device, the above-mentioned magnetic pattern is reproduced by the magnetic head to obtain signals, and the servo burst signals produced based on such signals are recorded by the magnetic head.

Further, it is preferable that signals recorded for the magnetic pattern according to the present invention remain in an area which is not used as a user's data area, after the servo burst signals have been recorded by the magnetic head. In this case, the magnetic head can easily be moved to a desired position even when a positional deviation of the magnetic head takes place due to any disturbance. Accordingly, such a magnetic recording device which can hold signals produced by the recording methods is highly reliable.

A magnetic disk device as a typical example of the magnetic recording device will be described.

The magnetic disk device comprises generally a shaft for holding a single or a plurality of magnetic disks by penetrating it or them, a motor for rotating the magnetic disk or disks connected to the shaft by interposing a bearing or bearings, a magnetic head for recording and/or reproducing information, an arm attached with the head and an actuator for moving the head via the arm to a desired position on the magnetic recording medium, wherein the head for recording/reproducing is moved above the magnetic recording medium at a constant flying height. Data or information is recorded by the magnetic head after it has been converted into recording signals via the signal processing means. Further, reproducing signals taken by the magnetic head are converted inversely by means of the signal processing means whereby a reproducing information is obtainable.

Information signals are recorded in each sector along tracks formed concentrically in the magnetic disk. A servo pattern is generally recorded between sectors. The magnetic head takes the servo signals from the servo pattern whereby the head performs correctly tracking around the center of a track to read the information signals in the sectors. In the recording, the tracking is performed as well.

As described above, since the servo pattern which generates servo signals is used for the tracking to record information, high accuracy is in particular required. Further, since a servo pattern widely used at present is comprised of two sets of patterns, wherein the patterns are shifted mutually by ½ pitch per track, it is necessary to form the servo pattern for each ½ pitch of information signals, and accuracy is required twice.

However, in the conventional servo pattern forming method, vibrations are resulted in the magnetic recording device because the center of gravity of the outer pin is different from that of the actuator. Accordingly, the width of the track for writing was considered to be about 0.2–0.3 $\mu$m as the minimum value. Therefore, the accuracy of the servo pattern can not follow an increase of track density, and it is difficult to improve recording density and to reduce cost for the magnetic recording device.

On the other hand, according to the present invention, since a magnetic pattern of high accuracy can effectively be formed by using a reduced image forming technique, the servo pattern can be formed accurately at a very low cost in a short time in comparison with the conventional servo pattern forming method. For example, the track density of the medium can be increased to 40 kTPI or more. Accordingly, the magnetic recording device using the medium according to the present invention permits high density recording.

Further, use of a phase servo system provides continuously changing servo signals whereby the track density can further be increased. Since the tracking is possible with a width of 0.1 $\mu$m or less, further high density recording can be performed.

As described before, in the phase servo system, a magnetic pattern extending, for instance, linearly in a oblique direction with respect to the radius of the disk from its inner circumferential portion to an outer circumferential portion is used. It was difficult to form a pattern continuous to the radial direction or a pattern oblique to the radius by the conventional servo pattern forming method wherein the servo signals were recorded for each track while the disk was rotated, and complicated calculation or a complicated system structure were needed.

According to the present invention, however, since it is enough to prepare once a mask corresponding to the shape, and to irradiate energy beams through the mask, the pattern can easily be formed. A magnetic recording medium used for the phase servo system can easily and economically be formed in a short time. Further, a magnetic recording device of phase servo system capable of high density recording can be provided.

In a widely used conventional servo pattern forming method, a magnetic recording medium is assembled in a magnetic recording device (drive), and then, a servo pattern is formed with a servo writer for exclusive use in a clean room.

Namely, each drive is mounted on the servo writer; the pin of the servo writer is inserted into the opening formed in either a front surface or a rear surface of the drive, and recoding is conducted for each pattern along a track while the magnetic head is moved mechanically. Accordingly, it takes much time as about 15–20 min per drive. Since the servo writer of exclusive use has to be used and the opening is formed in the drive, these operations have to be conducted in a clean room, and the processes are complicated so that manufacturing cost increases.

On the other hand, in the present invention, by irradiating energy beams through the mask in which the pattern is previously recorded, the servo pattern or the standard pattern for recording the servo pattern can be recorded in a lump, and accordingly, the servo pattern can be formed in the medium in a short time by a very simple manner. The magnetic recording device with the medium in which the servo pattern is formed dispenses with the above-mentioned servo pattern writing step. Or, the magnetic recording device with the medium in which the standard pattern for recording the servo pattern is formed permits to write, in the device, a desired servo pattern on the basis of the standard pattern. Therefore, the above-mentioned servo writer is unnecessary, and the operations in the clean room is also unnecessary. Further, since it is unnecessary to form an opening at the rear side of the magnetic recording device, the device is preferable from the viewpoint of durability and safety.

Further, since the photomask is not required to bring it close contact with the medium, a damage of the magnetic recording medium by the coming to contact with another structural member or a damage of the medium due to the interposition of a fine dust or foreign substance can be prevented to thereby prevent occurrence of defects.

As described above, according to the present invention, the magnetic recording device capable of high density recording is obtainable by simple steps at a low cost.

Various kinds of magnetic head such as a thin film head, a MR head, a GMR head, a TMR head and so on may be used for the magnetic recording device of the present invention. By constituting the reproducing portion of the magnetic head by the MR head, a sufficient signal intensity can be obtained even in high density recording, and a magnetic recording device of higher recording density can be realized.

When the magnetic head is moved at a flying height of not less than 0.001 μm but not more than 0.05 μm, an output of signal can be improved to provide a high S/N, and a magnetic recording device of large capacity and being highly reliable can be provided.

Further, when such technique is combined with a signal treating circuit according to a special decoding method, the recording density can further be improved. For example, a sufficient S/N can be obtained even when recording or reproducing is performed with a track density of 13 kTPI or more, a linear recording density of 250 kFCI or more and a recording density of 3 G bits or more per square inch.

Further, the signal intensity can further be increased by constituting the reproducing portion of the magnetic head by a plurality of electrically conductive magnetic layers, which provide a large change of resistance due to a relative change of mutual magnetization directions caused by applying an external magnetic field, and a GMR head comprising an electrically conductive non-magnetic layer located between the plurality of electrically conductive magnetic layers, or a GMR head utilizing a spin-valve effect. With use of such magnetic head, a highly reliable magnetic recording device having a recording density of 10 G bits or more per square inch and a linear recording density of 350 kFCI or more can be realized.

EXAMPLE

Now, the present invention will be described in further detail with reference to Examples and Comparative Examples. However, it should be understood that the present invention is by no means restricted to such specific Examples.

Example 1

A NiP-plated aluminum alloy substrate having a diameter of 3.5 inch (thickness: 1.0 mm) was washed and dried, and 60 nm of NiAl, 10 nm of $Cr_{94}Mo_6$, 22 nm of $Co_{72}Cr_{18}Pt_{10}$ as a magnetic layer and 3 nm of carbon (diamond-like carbon) as a protective layer were successively formed thereon under such conditions that the ultimate vacuum degree: $1.3 \times 10^{-5}$ Pa, the substrate temperature: 350° C., the bias voltage: −200 V, the sputtering gas: Ar, and the gas pressure: $4 \times 10^{-1}$ Pa.

The surface roughness Ra and the undulation Wa of the magnetic disk were respectively 0.5 nm and 0.8 nm. As a lubricant layer, a fluorine-type lubricant was coated thereon in a thickness of 1.5 nm and baked at 100° C. for 40 minutes to obtain a longitudinally recording magnetic disk having a coercive force of 3,000 Oe and a saturated magnetization of 310 emu/cc at room temperature. The Curie temperature of the magnetic layer was 250° C.

The reflectivity of this magnetic disk to excimer pulse laser having a wavelength of 248 nm was about 35%.

The disk surface was uniformly magnetized by applying a magnetic field with an intensity of about 10 kG (Gauss) to this disk so that the magnetic field direction of the electromagnet would be same as the rotational direction of the disk.

When the magnetic intensity is expressed by B (unit: Gauss), the magnetic field is H (unit: Oersted) and the magnetic permeability is μ, the relation of B=μ·H is established. Since the magnetic permeability is about 1 in air, the value of a magnetic intensity of 10 kG is equal to a magnetic field of 10 kOe.

Above this disk, a Cr photomask using quartz glass as the substrate was disposed with a space of about 10 μm. For this photomask, the quartz glass substrate having a square shape of 127 mm×127 mm, a thickness of 2.3 mm and a degree of flatness of pattern forming area of about 2 μm was used. 75 nm of chromium and 25 nm of chromium oxide were successively formed on the surface facing the disk as shown in FIG. 2(a), followed by etching the multi-layer into a pattern as shown in FIG. 3 to form a non-transmitting portion on the quartz glass.

The reflectivity of the photomask to an excimer pulse layer having a wavelength of 248 nm was about 16% in the non-transmitting portion and about 5% in a transmitting portion.

Figure 3B:
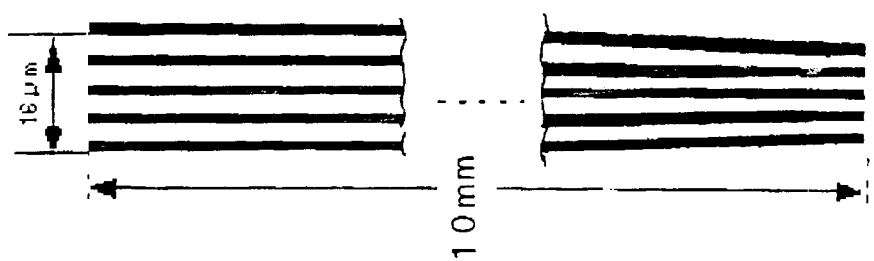
FIG. 3(b) is an enlarged view of a portion B in FIG. 3(a).
Figure 3A:
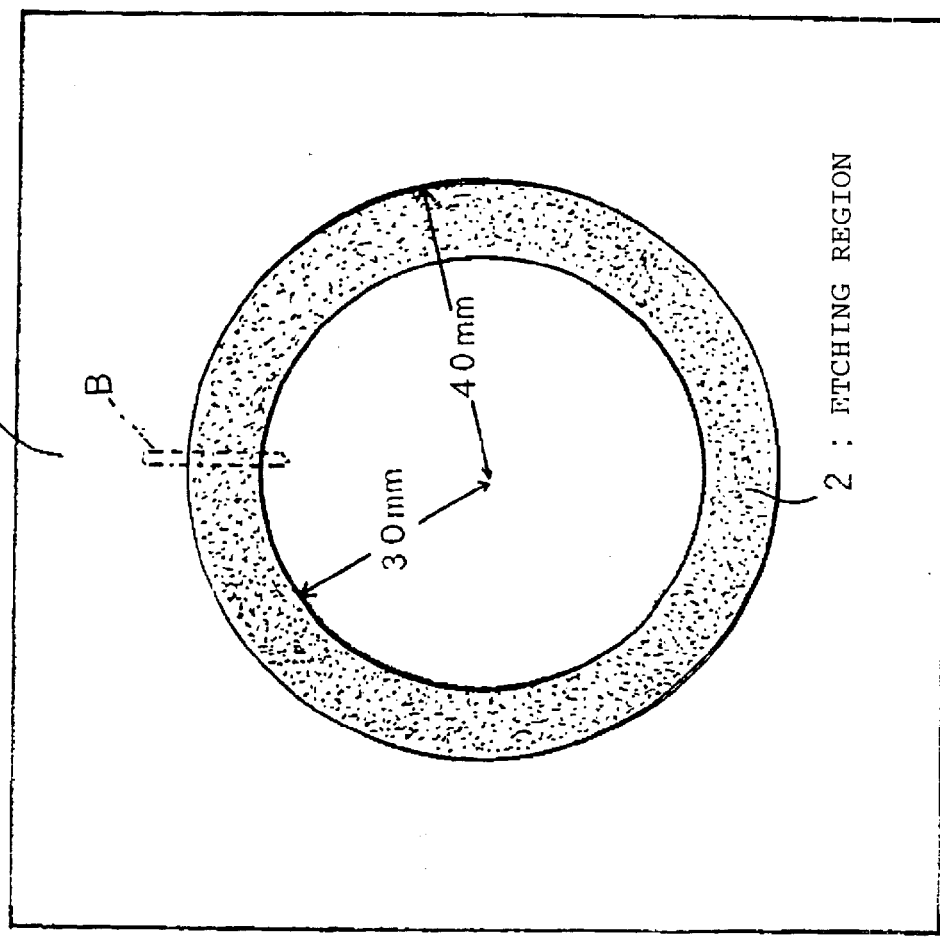
FIG. 3(a) is a plan view showing diagrammatically an etching pattern formed on the photomask in Example 1 and Comparative Example 1.

The thus formed etched pattern is such that a radial pattern having a length of 10 mm, as shown in FIG. 3(b) which is an enlarged view of a portion B in FIG. 3(a), is formed in an annularly etched area 2 (the radius of an inner circle: 30 mm, the radius of an outer circle: 40 mm) which is indicated by dot marks, in the quartz glass substrate 1 of 127 mm×127 mm square. In this pattern, the width of each radial line becomes larger and the distance between adjacent radial lines becomes wider toward its outer circumferential portion. The widest portion of each radial line is 2 μm and the widest distance between the adjacent radial lines is 2 μm in the extreme outer circumferential portion of the radial pattern.

The photomask was rotated integrally with the disk at a speed of 3.2 sec per revolution. Then, the printing of the magnetic pattern was attempted under the following conditions. An excimer pulse layer having a wavelength of 248 nm was controlled to have a pulse width of 25 nsec, a power (energy density) of 100 mJ/cm² and a beam shape of 10 mm×30 mm (the diameter corresponding to $1/e^2$ of the peak energy); a shading plate for forming the beam shape into a sectorial shape having an angle of 12° was disposed at the laser irradiation port, and pulsed laser was irradiated 32 pulses at a repetitive frequency of 10 Hz and at the same time, a magnetic field of about 1.7 kG was applied by using a permanent magnet in a circumferential direction of the magnetic disk so that said direction is opposite to the direction of the uniform magnetization.

In obtaining the heating temperature by simulation, it was found that the temperature was about from 180° C. to 200° C.

Here, the structure of the optical system for laser irradiation is as follows.

The pulsed layer radiated from an excimer pulse laser source is passed through a programmable shutter which serves to take only a predetermined number of pulses from the laser source.

Laser selected by the programmable shutter is converted into a predetermined power in an attenuator.

Then, the laser is passed through a homogenizer (fly eye lens) for dividing the short axis direction into three portions and a homogenizer (fly eye lens) for dividing the long axis direction into seven portions, and then, the laser reaches a projection lens. The homogenizers (fly eye lenses) function to divide and superimpose the laser so as to equalize the energy intensity distribution. Further, the laser is passed through the shading plate, according to requirement, to have a predetermined beam shape, and is passed through the photomask, in which the intensity distribution is changed according to the magnetic pattern, to be projected onto the disk.

Then, the magnetic pattern formed in the disk was developed by a magnetic developer, and the magnetic pattern was observed with an optical microscope as to whether the pattern was good or not good. Table 1 shows a result (the presence or absence of an interference fringe).

Further, a magnetic pattern was formed in a magnetic disk under the same conditions. The magnetic pattern was reproduced with an MR head usable for a hard disk, which has a reproducing element having a width of 0.9 µm, to measure the modulation of reproducing signals. Table 1 shows a result. Since the reflectivity of the mask was low, the interference fringe was thin, and the modulation was good.

Comparative Example 1

A magnetic disk was prepared under the same conditions as Example 1, and the magnetic pattern was printed under the same conditions as Example 1 by using the photomask formed in the same manner as Example 1 except that the chromium oxide layer was not formed. Observation was also made as to whether the magnetic pattern was good or not good, and was also made on the modulation. Table 1 shows a result.

The reflectivity of the photomask to the excimer pulse laser having a wavelength of 248 nm was about 37% in the non-transmitting portion and about 5% in the transmitting portion.

Example 2

Above a magnetic disk prepared under the same conditions as Example 1, a Cr photomask using quartz glass as the substrate is disposed with a space of about 10 µm. For this photomask, the quartz glass substrate having a square shape of 127 mm×127 mm, a thickness of 2.3 mm and a degree of flatness of pattern forming area of about 2 µm is used. 75 nm of chromium and 25 nm of chromium oxide are successively formed on the substrate surface facing the disk as shown in FIG. 2(c) followed by etching the multi-layer into a pattern as shown in FIG. 3 to form a non-transmitting portion on the quartz glass. Then; 6.6 nm of $TiO_2$ and 56.9 nm of $SiO_2$ are successively formed by sputtering on both surfaces of the mask to thereby form dielectric layers. Each of the dielectric layers is a so-called V coat layer. The reflectivity of the photomask to an excimer pulse laser having a wavelength of 248 nm after the formation of the dielectric layers, is 0.5%.

The printing of the magnetic pattern was conducted under the same conditions as Example 1, and the thus formed magnetic pattern was examined as to whether it was good or not, and also, on the modulation in the same manner as Example 1. Table 1 shows a result obtained. Since the reflectivity of the mask is extremely low, there is observed no interference fringe, and a pattern in agreement with the pattern formed on the mask can be formed on the disk surface. Further, the modulation is very good.

Example 3

A photomask is prepared in the same manner as Example 2 except that each of the dielectric layers is a coat layer formed by successively 7.1 nm of $TiO_2$ and 61 nm of $SiO_2$. The reflectivity of the photomask to a YAG pulse laser having a wavelength of 266 nm after the formation of the dielectric layers, is 0.5%.

The photomask is rotated integrally with the disk at a speed of 3.2 sec per revolution. Then, the printing of a magnetic pattern is conducted in the same manner as Example 1 except that the YAG pulse laser having a wavelength of 266 nm is controlled to have a pulse width of 5 nsec, a power (energy density) of 70 mJ/cm$^2$ and a beam shape of 10 mm×30 mm (a diameter corresponding to 1/e$^2$ of the beak energy); a shading plate for forming the beam shape into a sectorial shape having an angle of 12° is disposed at the laser irradiation port, and pulsed laser is irradiated 32 pulses at a repetitive frequency of 10 Hz and at the same time, a magnetic field of about 1.7 kG is applied by using a permanent magnet in a circumferential direction of the magnetic disk so that said direction is opposite to the direction of the uniform magnetization.

In obtaining the heating temperature by simulation, there is found about 180° C. to 200° C. When the YAG laser is used, the diameter of the YAG laser beams should be enlarge by a beam expander before the energy intensity distribution is made uniform by the homogenizer.

The magnetic pattern is observed as to whether good or not good, and also, as to the modulation in the same manner as Example 1. Table 1 shows a result obtained. Since the reflectivity of the mask is very low, there is observed no interference fringe, and a pattern in agreement with the pattern formed on the mask can be formed on the disk surface, and the modulation is very good.

TABLE 1

| | Reflectivity of photomask | Presence or absence of interference fringe | Modulation |
|---|---|---|---|
| Example 1 | 16/5 | Thin fringe | 12% |
| Comparative Example 1 | 37/5 | Thick fringe | 28% |
| Example 2 | 0.5 | None | 6% |
| Example 3 | 0.5 | None | 5% |

Example 4

A NiP-plated aluminum alloy substrate having a diameter of 3.5 inch was washed and dried, and 60 nm of NiAl, 10 nm of $Cr_{90}Mo_{10}$, 12 nm of $Co_{64}Cr_{16}Pt_{12}B_8$ as a magnetic layer and 5 nm of carbon (diamond-like carbon) as a protective layer were successively formed on the substrate.

Then, a fluorine-type lubricant as a lubricant layer was coated thereon in a thickness of 0.5 nm and baked at 100° C. for 40 minutes to obtain a longitudinally recording magnetic disk having a static coercive force of 3,600 Oe and a saturated magnetization of 310 emu/cc at room temperature. The Curie temperature of the recording layer was 250° C.

The reflectivity of this magnetic disk to excimer pulse laser having a wavelength of 248 nm was about 35%.

The surface of this disk was magnetized uniformly in the same manner as Example 1.

Next, a photomask in which a pattern area was formed in a radius of from 18 to 45 mm, and substantially circular projections (spacers) of 2.5 µm high and 50 µm in diameter were formed with intervals of 50 µm in a circumferential portion of the pattern area, i.e., an area ranging from about 47 to 48 mm in diameter, which was an outer side of the pattern area, was prepared. For this photomask, a quartz glass substrate having a square shape of 127 mm×127 mm, a thickness of 2.3 mm and a degree of flatness of pattern area of about 2 μm was used. 75 nm of chromium was formed on the substrate surface facing the disk, followed by etching the formed layer to form a non-transmitting portion as show in FIG. 2(c).

Then, 43.5 nm of $SiO_2$, 37.2 nm of $Al_2O_3$ and 43.5 nm of $SiO_2$ were successively formed by sputtering on both surfaces of the mask to form dielectric layers under such conditions that the ultimate vacuum degree: $2\times10^{-7}$ Pa, the substrate temperature: 200° C., the sputtering gas: Ar (+0.2% $O_2$) and the gas pressure: $2.9\times10^{-1}$ Pa. The target power was 200 W of $SiO_2$ and 500 W of $Al_2O_3$.

Each of the dielectric layers is a so-called V coat layer. The reflectivity of the photomask to an excimer pulse laser having a wavelength of 248 nm after the formation of the dielectric layers, is 5.55%.

On this disk, the photomask was disposed with a space of about 2.5 μm by means of the projections (spacers).

The photomask was rotated integrally with the disk at a speed of 3.2 sec per revolution. Then, the printing of a magnetic pattern was attempted under the following conditions. An excimer pulse laser having a wavelength of 248 nm was controlled to have a pulse width of 25 nsec, a power (energy intensity) of 165 mJ/cm$^2$ and a beam shape of 10 mm×30 mm (a diameter corresponding to 1/e$^2$ of the peak energy); a shading plate for forming the beam shape into a sectorial shape having an angle of 12° was disposed at the laser irradiation port, and pulsed laser was irradiated 32 pulses at a repetitive frequency of 10 Hz and at the same time, a magnetic field of about 3 kG was applied by using a permanent magnet in a circumferential direction of the magnetic disk so that the said direction was opposite to the direction of the uniform magnetization.

In obtaining the heating temperature by simulation, it was found that the temperature was from about 180° C. to 200° C.

The structure of the optical system for laser irradiation is the same as in Example 1.

The magnetic pattern formed in the disk was developed by a magnetic developer, and the developed magnetic pattern was observed with an optical microscope as to whether the magnetic pattern was good or not good. Further, the magnetic pattern was formed in the magnetic disk by using the same condition, and then, the magnetic pattern was reproduced with an MR head for hard disk, which has a reproducing element having a width of 0.9 μm, to measure the modulation of reproducing signals. Since the reflectivity of the mask was low, there was observed no interference fringe, and the modulation was good as 22%.

Further, the durability of the photomask after energy beams have been irradiated repeatedly, was sufficiently high.

Comparative Example 2

A magnetic disk was prepared by the same conditions as Example 4. The printing of the magnetic pattern was conducted under the same conditions as Example 4 by using the photomask which was prepared in the same manner as Example 4 except that no dielectric layer was formed. The reflectivity of the photomask to the excimer pulse laser having a wavelength of 248 nm was about 37% in the non-transmitting portion and about 5% in the transmitting portion.

In observing the magnetic pattern as to whether good or not good and the modulation in the same manner Example 4, a thick interference fringe was found and the modulation was large as 45%.

As described above, the method for forming a magnetic pattern in a magnetic recording medium and the photomask according to the present invention provide the following advantages.

1) In forming a magnetic pattern, it is unnecessary to use a strong external magnetic field, as in the conventional technique, since locally heating and the application of an external magnetic field are used in combination. Further, the formation of magnetic domains can be limited to a heated area since magnetization can not be effected even when the magnetic field is applied to an area other than the heated area. Accordingly, the boundary of magnetic domains becomes clear and a pattern having a small magnetic transition width, a very steep magnetic transition at the boundary of the magnetic domains and output signals of high quality can be formed. It is possible to obtain a magnetic transition width of 1 μm or less by selecting properly the conditions.

2) Since it is unnecessary to contact closely the magnetic recording medium with the master disk as in the conventional technique, there is no danger of damaging the medium or the mask, or increasing defects in the medium.

3) A magnetic pattern oblique to the tracks can be formed well.

4) Since energy beams are used for heating a local portion, the size of a heated portion or the power used can easily be controlled, and a magnetic pattern can be formed with precision.

5) When the photomask is once prepared, a magnetic pattern of any shape can be formed in a magnetic recording medium. Accordingly, a complicated pattern or a special pattern which was difficult to form by the conventional technique, can easily be formed. Further, the photomask can easily be formed in an economical manner.

6) The influence of the reflection of energy beams can be lessened; the production of an interference fringe can be suppressed, and a highly accurate magnetic pattern can be formed.

7) The magnetic recording medium having a magnetic pattern formed by using the photomask of the present invention have excellent features that the influence of an interference fringe can be suppressed, the accuracy of the magnetic pattern is high, and the modulation of output signals for the magnetic pattern is small 8) By introducing the technique of the present invention to a manufacturing line of magnetic recording media, a magnetic recording medium having a highly accurate magnetic pattern for controlling a head, can be prepared economically in a short time.

In the magnetic recording medium of the present invention in which a magnetic pattern is formed by using the photomask of the present invention and according to the method of the present invention, the influence of an interference fringe can be suppressed, and a fine pattern having a small modulation of reproducing signals can be formed with high accuracy. In addition, a pattern having a small magnetic transition width, a very steep magnetic transition at the boundary of magnetic domains and output signals of high accuracy can be formed. Further, the magnetic recording medium can easily be produced in a very short time, and has few flaw and defect because it is unnecessary to contact it with the master disk as in the conventional technique. The present invention is in particular effective to a magnetic recording medium for high density recording because in the conventional technique, it is difficult to write servo signals for high density recording, and the recording of servo signals creates the main cause of increasing cost.

Further, in the magnetic recording device of the present invention having a magnetic recording medium in which a magnetic pattern is formed by using the magnetic pattern forming method of the present invention, high density recording can be performed because the magnetic recording medium having a magnetic pattern of high density such as a servo pattern or the like is used. Further, since there is little flaw and defect in the medium, it is possible to conduct error-less recording.

What is claimed is:

1. A method for forming a magnetic pattern in a magnetic recording medium, comprising:
    irradiating energy beams to the magnetic recording medium, which includes a magnetic layer on a substrate, via a photomask having a transmitting portion and a non-transmitting portion to heat locally an irradiated portion of the magnetic layer and;
    applying an external magnetic field to the magnetic layer, wherein the transmitting portion and the non-transmitting portion of the photomask each has a reflectivity of 30% or less in at least one surface facing the magnetic recording medium.

2. The method for forming a magnetic pattern in a magnetic recording medium according to claim 1, wherein an outermost layer, facing the magnetic recording medium, of the non-transmitting portion of the photomask is a chromium oxide layer.

3. The method for forming a magnetic pattern in a magnetic recording medium according to claim 1, wherein an outermost layer, facing the magnetic recording medium, of the non-transmitting portion of the photomask is a dielectric layer.

4. The method for forming a magnetic pattern in a magnetic recording medium according to claim 3, wherein the reflectivity at the surface of the dielectric layer of the photomask is 1% or less.

5. The method for forming a magnetic pattern in a magnetic recording medium according to claim 3, wherein the dielectric layer is a V-coat layer.

6. The method for forming a magnetic pattern in a magnetic recording medium according to claim 3, wherein the dielectric layer is formed by a sputtering method.

7. The method for forming a magnetic pattern in a magnetic recording medium according to claim 6, wherein the energy beams are pulsed energy beams.

8. The method for forming a magnetic pattern in a magnetic recording medium according to claim 7, wherein the power per pulse of the pulsed energy beams is from 10 $mJ/cm^2$ to 1,000 $mJ/cm^2$.

9. The method for forming a magnetic pattern in a magnetic recording medium according to claim 6, wherein the surface on which the dielectric layer is formed is a surface having recesses and projections.

10. The method for forming a magnetic pattern in a magnetic recording medium according to claim 1, wherein an outermost layer, facing the magnetic recording medium, of the transmitting portion of the photomask is a dielectric layer.

11. The method for forming a magnetic pattern in a magnetic recording medium according to claim 1, wherein an outermost layer, on the apposite side of the magnetic recording medium, of the photomask is a dielectric layer.

12. The method for forming a magnetic pattern in a magnetic recording medium according to claim 1, wherein the substrate of the photomask is made of a material containing quartz as a main component.

13. The method for forming a magnetic pattern in a magnetic recording medium according to claim 1, wherein in the formation of a magnetic pattern, the photomask is disposed with a space of 1 mm or less to the magnetic recording medium.

14. The method for forming a magnetic pattern in a magnetic recording medium according to claim 1, wherein the magnetic recording medium has a reflectivity of 30% or more.

15. A magnetic recording medium having a magnetic pattern formed according to the following steps:
    irradiating energy beams to the magnetic recording medium, which includes a magnetic layer on a substrate, via a photomask having a transmitting portion and a non-transmitting portion to heat locally an irradiated portion of the magnetic layer, and
    applying an external magnetic field to the magnetic layer, wherein the transmitting portion and the non-transmitting portion of the photomask each has a reflectivity of 30% or less in at least one surface facing the magnetic recording medium.

16. A magnetic recording medium having a magnetic layer on a substrate, wherein a magnetic pattern is formed by irradiating energy beams to the magnetic recording medium via a photomask having a transmitting portion and a non-transmitting portion to heat locally an irradiated portion of the magnetic layer, and applying an external magnetic field to the magnetic layer, and wherein the modulation of the magnetic pattern is 25% or less.

17. A magnetic recording device comprising:
    a magnetic recording medium including a magnetic pattern formed by,
    irradiating energy beams to the magnetic recording medium, which includes a magnetic layer on a substrate, via a photomask having a transmitting portion and a non-transmitting portion to heat locally an irradiated portion of the magnetic layer, and
    applying an external magnetic field to the magnetic layer, wherein the transmitting portion and the non-transmitting portion of the photomask each has a reflectivity of 30% or less in at least one surface facing the magnetic recording medium;
    driving means for driving the magnetic recording medium in a recording direction;
    a magnetic head having a recording portion and a reproducing portion;
    means for moving relatively the magnetic head with respect to the magnetic recording medium; and
    recording/reproducing signal processing means which supplies a recording signal to the magnetic head and receives a reproducing signal from the magnetic head.

18. The magnetic recording device according to claim 17, wherein after the magnetic recording medium has been put on the magnetic recording device, the magnetic pattern is reproduced by the magnetic head to obtain signals, and servo burst signals produced based on the signals are recorded by the magnetic head.

19. A photomask comprising:
    a transmitting portion; and
    a non-transmitting portion,
    wherein the photomask is used for a method for forming a magnetic pattern in a magnetic recording medium, the method including irradiating energy beams to a magnetic recording medium having a magnetic layer on a substrate via the photomask to heat locally an irradiated portion of the magnetic layer, and applying an external magnetic field to the magnetic layer, and wherein the transmitting portion and the non-transmitting portion of the photomask each has a reflectivity of 30% or less in at least one surface facing the magnetic recording medium.

20. The photomask according to claim 19, wherein an outermost layer, facing the magnetic recording medium, of the non-transmitting portion of the photomask is a chromium oxide layer.

21. The photomask according to claim 19, wherein an outermost layer, facing the magnetic recording medium, of the non-transmitting portion of the photomask is a dielectric layer.

22. The photomask according to claim 21, wherein the reflectivity at the surface of the dielectric layer of the photomask is 1% or less.

23. The photomask according to claim 21, wherein the dielectric layer is a V-coat layer.

24. The photomask according to claim 21, wherein the dielectric layer is formed by a sputtering method.

25. The photomask according to claim 24, wherein the energy beams are pulsed energy beams.

26. The photomask according to claim 25, wherein the power per pulse of the pulsed energy beams is from 10 mJ/cm$^2$ to 1,000 mJ/cm$^2$.

27. The photomask according to claim 24, wherein the surface on which the dielectric layer is formed is a surface having recesses and projections.

28. The photomask according to claim 19, wherein an outermost layer, facing the magnetic recording medium, of the transmitting portion of the photomask is a dielectric layer.

29. The photomask according to claim 19, wherein an outermost layer, on the opposite side of the magnetic recording medium, of the photomask is a dielectric layer.

30. The photomask according to claim 19, wherein the substrate of the photomask is made of a material containing quartz as a main component.

31. The photomask according to claim 19, wherein the magnetic recording medium has a reflectivity of 30% or more.

32. A magnetic recording device comprising:

a magnetic recording medium including a magnetic layer on a substrate, wherein a magnetic pattern is formed by irradiating energy beams to the magnetic recording medium via a photomask having a transmitting portion and a non-transmitting portion to heat locally an irradiated portion of the magnetic layer, and by applying an external magnetic field to the magnetic layer, and wherein the modulation of the magnetic pattern is 25% or less;

driving means for driving the magnetic recording medium in a recording direction;

a magnetic head having a recording portion and a reproducing portion;

means for moving relatively the magnetic head with respect to the magnetic recording medium; and recording/reproducing signal processing means which supplies a recording signal to the magnetic head and receives a reproducing signal from the magnetic head.

33. The magnetic recording device according to claim 32, wherein after the magnetic recording medium has been put on the magnetic recording device, the magnetic pattern is reproduced by the magnetic head to obtain signals, and servo burst signals produced based on the signals are recorded by the magnetic head.

* * * * *